(12) United States Patent
Sato

(10) Patent No.: US 8,323,557 B2
(45) Date of Patent: Dec. 4, 2012

(54) METHOD FOR MANUFACTURING HONEYCOMB STRUCTURE

(75) Inventor: Hiroki Sato, Ibi-gun (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 0 days.

(21) Appl. No.: 13/419,467

(22) Filed: Mar. 14, 2012

(65) Prior Publication Data

US 2012/0168995 A1   Jul. 5, 2012

Related U.S. Application Data

(62) Division of application No. 12/363,396, filed on Jan. 30, 2009, now Pat. No. 8,168,127.

(30) Foreign Application Priority Data

Feb. 13, 2008  (JP) .................................. 2008/052374

(51) Int. Cl.
   *B28B 3/20* (2006.01)
(52) U.S. Cl. ...................................... 264/630
(58) Field of Classification Search ................... 264/630, 264/631; 422/177, 179, 180; 55/523; 428/116
   See application file for complete search history.

(56) References Cited

U.S. PATENT DOCUMENTS

| | | | |
|---|---|---|---|
| 4,777,152 A | 10/1988 | Tsukada | |
| 5,914,187 A | 6/1999 | Naruse et al. | |
| 6,669,751 B1 | 12/2003 | Ohno et al. | |
| 7,112,233 B2 | 9/2006 | Ohno et al. | |
| 7,284,980 B2 | 10/2007 | Saijo et al. | |
| 7,309,370 B2 | 12/2007 | Kudo et al. | |
| 7,314,496 B2 | 1/2008 | Hong et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |

(Continued)

FOREIGN PATENT DOCUMENTS

EP   1375849   1/2004

(Continued)

OTHER PUBLICATIONS

Extended European Search Report for corresponding EP Application No. 08291144.7-1253, Mar. 28, 2011.

*Primary Examiner* — Matthew Daniels
*Assistant Examiner* — Russell Kemmerle, III
(74) *Attorney, Agent, or Firm* — Ditthavong Mori & Steiner, P.C.

(57) ABSTRACT

A method for manufacturing a honeycomb structure includes molding a ceramic raw material to manufacture at least one honeycomb molded body having a plurality of cell walls to define cells. First cells and third cells are filled with plug material paste at first end portions and at third portions, respectively, to form first plugs. The at least one honeycomb molded body is fired to manufacture at least one honeycomb fired body. The at least one honeycomb fired body is cut along a plane substantially perpendicular to the longitudinal direction to create a second end face side of the at least one honeycomb fired body. Second end portions of second cells are filled with plug material paste. The plug material paste in the second end portions is solidified through heating to form second plugs. A honeycomb block including at least one honeycomb fired body is produced.

19 Claims, 12 Drawing Sheets

U.S. PATENT DOCUMENTS

| | | |
|---|---|---|
| 7,396,586 B2 | 7/2008 | Ohno et al. |
| 7,427,308 B2 | 9/2008 | Taoka et al. |
| 7,427,309 B2 | 9/2008 | Ohno et al. |
| 7,438,967 B2 | 10/2008 | Fujita |
| 7,449,427 B2 | 11/2008 | Ohno et al. |
| 7,462,216 B2 | 12/2008 | Kunieda et al. |
| 7,473,465 B2 | 1/2009 | Ohno et al. |
| 7,491,057 B2 | 2/2009 | Saijo et al. |
| 7,498,544 B2 | 3/2009 | Saijo et al. |
| 7,504,359 B2 | 3/2009 | Ogyu et al. |
| 7,520,178 B2 | 4/2009 | Ohno et al. |
| 7,524,350 B2 | 4/2009 | Kunieda |
| 7,540,898 B2 | 6/2009 | Oshimi |
| 7,543,513 B2 | 6/2009 | Kobayashi et al. |
| 7,550,026 B2 | 6/2009 | Hayakawa |
| 7,556,666 B2 | 7/2009 | Kunieda |
| 2004/0131772 A1 | 7/2004 | Yamada et al. |
| 2004/0161596 A1 | 8/2004 | Taoka et al. |
| 2005/0011174 A1 | 1/2005 | Hong et al. |
| 2005/0103232 A1 | 5/2005 | Gadkaree et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0210848 A1 | 9/2005 | Kuki et al. |
| 2005/0247038 A1 | 11/2005 | Takahashi |
| 2005/0272602 A1 | 12/2005 | Ninomiya |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0168927 A1 | 8/2006 | Watanable et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1450015 | 8/2004 |
| EP | 1580181 | 9/2005 |
| EP | 1666118 | 6/2006 |
| JP | 56-129113 | 10/1981 |
| JP | 58-045715 | 3/1983 |
| JP | 2000-279729 | 10/2000 |
| JP | 2001-162121 | 6/2001 |
| JP | 2004-168030 | 6/2004 |
| JP | 2005-046839 | 2/2005 |
| JP | 2005-154202 | 6/2005 |
| JP | 2005-270755 | 10/2005 |
| JP | 2006-150276 | 6/2006 |
| WO | WO 03/093658 | 11/2003 |
| WO | WO 2004/024293 | 3/2004 |

B-B line cross-sectional view

B-B line cross-sectional view

METHOD FOR MANUFACTURING HONEYCOMB STRUCTURE

CROSS-REFERENCE TO RELATED APPLICATIONS

The present application is a divisional application of the U.S. patent application Ser. No. 12/363,396 filed Jan. 30, 2009, which claims priority under 35 U.S.C. §119 to PCT Application No. PCT/JP2008/052374, filed Feb. 13, 2008, the contents of which are incorporated herein by reference in their entirety.

BACKGROUND OF THE INVENTION

1. Field of the Invention

The present invention relates to a honeycomb structure, an exhaust gas purifying apparatus and a method for manufacturing the honeycomb structure.

2. Discussion of the Background

Exhaust gases discharged from conventional internal combustion engines such as a diesel engine contain particulate matter (hereinafter, also referred to as PM). In recent years, the PM has raised serious problems because it is harmful to the environment and the human body.

For this reason, various honeycomb filters such as a honeycomb filter including a porous ceramic honeycomb structure have been proposed as filters that capture PM in exhaust gases and purify the exhaust gases.

As such a honeycomb structure, JP-A 2001-162121 discloses a honeycomb structure in which a plurality of filters including a porous ceramic sintered body are integrated by bonding peripheral faces of the filters with one another with a sealing material layer interposed therebetween.

The contents of JP-A 2001-162121 are incorporated herein by reference in their entirety.

SUMMARY OF THE INVENTION

According to one aspect of the present invention, a method for manufacturing a honeycomb structure includes molding a ceramic raw material to manufacture at least one honeycomb molded body having a plurality of cell walls extending along a longitudinal direction of the at least one honeycomb molded body to define cells. First cells at first end portions provided at a first end face side of the at least one honeycomb molded body in the longitudinal direction are filled with plug material paste to form first plugs. Third cells at third end portions provided at a third end face side of the at least one honeycomb molded body in the longitudinal direction are filled with plug material paste to form first plugs. The at least one honeycomb molded body is fired to manufacture at least one honeycomb fired body having first plugs. The at least one honeycomb fired body is cut along a plane substantially perpendicular to the longitudinal direction to create a second end face side of the at least one honeycomb fired body. Second end portions of second cells provided at the second end face side in the longitudinal direction are filled with plug material paste. The second cells have none of the first and third plugs. The plug material paste in the second end portions is solidified through heating to form second plugs. A honeycomb block including at least one honeycomb fired body is produced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
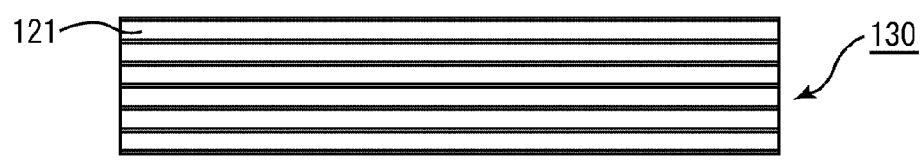
FIGS. 1A, 1B, 1C, 1D, 1E, 1F, 1G and 1H are explanatory views each illustrating manufacturing processes of a first embodiment of the present invention.
Figure 1B:
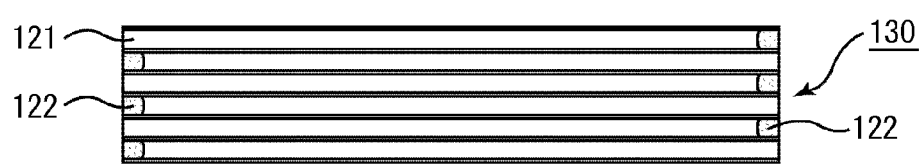

Embodiments will now be described with reference to the accompanying drawings, wherein like reference numerals designate corresponding or identical elements throughout the various drawings.

A honeycomb structure described in JP-A 2001-162121 can be manufactured as follows.

First, a ceramic powder, a binder, a dispersant solution and the like are mixed to prepare a wet mixture.

Next, the wet mixture is extruded molded, and the extrusion-molded body is cut into a predetermined length to form a pillar-shaped honeycomb molded body.

Thereafter, a plug material paste is injected to a predetermined end of each cell of the honeycomb molded body to seal each cell at either one end. Next, the honeycomb molded body with the plug material paste filled therein is degreased and fired to form honeycomb fired bodies to be used as a filter.

Next, a plurality of the honeycomb fired bodies are combined with one another with a sealing material layer (adhesive layer) interposed therebetween to form an aggregated body of the honeycomb fired bodies. Thereafter, if necessary, the periphery of the aggregated body of the honeycomb fired bodies is cut and a coat layer is formed on the periphery of the aggregated body to manufacture a honeycomb structure.

In the conventional method for manufacturing a honeycomb structure described in JP-A 2001-162121, upon manufacturing a honeycomb molded body by extrusion-molding, the honeycomb molded body is formed to have almost the same shape as that of a honeycomb fired body to be manufactured, and various treatments such as sealing (plugging), degreasing and firing are carried out to form the honeycomb fired body.

In such a manufacturing method, the honeycomb fired body becomes slightly smaller than the honeycomb molded body because of the firing treatment. Here, the reduction in the size inevitably occurs.

For this reason, upon manufacturing a honeycomb molded body, the honeycomb molded body is formed to have a slightly larger size than that of a honeycomb fired body to be manufactured in consideration of the size reduction.

However, since the amount of the size reduction is an estimated value, the manufactured honeycomb fired bodies may have variations in the size depending on firing conditions and the like.

In case of using honeycomb fired bodies having variations in the size, when a honeycomb structure is manufactured by combining a plurality of the honeycomb fired bodies with one another, the manufactured honeycomb structure may have irregular end faces, and thus require a grinding treatment to be carried out on the end faces in some cases.

However, the end-face grinding treatment is desirably omitted, if possible. This is because the grinding treatment may cause problems such as occurrence of cracks on the end faces of the honeycomb structure and intrusion of ground powders into pores of the cell walls of the honeycomb structure. Moreover, additional treatments such as the end-face grinding treatment and a washing treatment for removing the ground powders intruded into the pores of the cell walls directly cause an increase in the cost.

Moreover, when a honeycomb molded body having almost the same shape as that of the honeycomb fired body to be manufactured is formed and various treatments are carried out thereon, as described in the above-mentioned method for manufacturing a honeycomb structure, the productivity tends to be lowered. In particular, this tendency becomes more apparent upon manufacturing a honeycomb structure having a shorter length in the longitudinal direction.

This will be described more in detail.

In such a conventional method as the above-mentioned method for manufacturing a honeycomb structure disclosed in JP-A 2001-162121, the firing treatment of the honeycomb molded bodies is usually carried out with a plurality of honeycomb molded bodies housed in a single firing jig. Here, in order to allow the molded bodies to be sintered positively and uniformly, the honeycomb molded bodies need to be housed with a certain distance interval therebetween.

For this reason, when a firing jig having a certain size is used, the smaller the honeycomb molded bodies housed in the firing jig are, the wider the area is occupied by a space (gap) between the honeycomb molded bodies, resulting in lower productivity of the honeycomb fired bodies.

In other words, in the firing jig having the certain size, for example, even when half-sized honeycomb molded bodies are used, the number of the honeycomb molded bodies that can be housed in the firing jig is not twice of the number of full-sized honeycomb molded bodies that can be housed in the firing jig, and less than twice thereof.

Moreover, a firing jig having a size that is best suited for the size of the honeycomb molded bodies is desirably used. Although it is preferable to prepare firing jigs having different sizes according to the sizes of the honeycomb molded bodies, the preparation of those firing jigs having different sizes causes an increase in the manufacturing cost.

In order to solve the above-mentioned problems, the present inventors have intensively studied, and completed the present invention.

The honeycomb structure according to embodiments of the present invention includes: a honeycomb block including a honeycomb fired body having a plurality of cells placed longitudinally in parallel with one another with a cell wall interposed therebetween and each having an end portion sealed with a plug formed by a plug material paste at either one end, wherein the plugs include fired first plugs on one end face side of the honeycomb fired body and unfired second plugs on an other end face side of the honeycomb fired body.

The honeycomb structure according to the embodiments of the present invention tends to be efficiently manufactured by the method for manufacturing a honeycomb structure according to embodiments of the present invention described below.

Moreover, in the honeycomb structure according to the embodiments of the present invention, the honeycomb fired body constituting the honeycomb structure has the fired plugs on one end face side, and the unfired plugs on the other end face side. For this reason, the unfired plugs make it easier to alleviate a thermal stress, while the fired plugs are less likely to cause cracks and peeling even under a high temperature, and therefore PM leakage is less likely to occur.

In the honeycomb structure according to the embodiments of the present invention, the unfired second plugs are solidified by heating.

As described above, when the unfired plugs are formed as solidified plugs, it makes easier to positively seal ends of the cells, while maintaining the effect for alleviating a thermal stress.

In the honeycomb structure according to the embodiments of the present invention, the second plugs are formed by using a plug material paste containing at least inorganic particles and an inorganic binder.

Such a plug material paste is particularly suitable for forming the unfired plugs, because the plug material paste has superior adhesiveness with the cell wall and a required strength.

In the honeycomb structure according to the embodiments of the present invention, the honeycomb block includes a plurality of the honeycomb fired bodies combined with one another with an adhesive layer interposed therebetween.

In the honeycomb structure according to the embodiments of the present invention, composition of the second plug is almost the same as composition of the adhesive layer.

When the composition of the second plug is almost the same as the composition of the adhesive layer, as described above, an inner stress caused by a difference between the thermal expansion coefficients of the component members is less likely to occur, leading to further improvement of the reliability.

In the honeycomb structure according to the embodiments of the present invention, the honeycomb block includes a single honeycomb fired body.

In the honeycomb structure according to the embodiments of the present invention, a coat layer is formed on a periphery of the honeycomb block.

The honeycomb structure according to the embodiments of the present invention has further improved reliability because PM is further less likely to leak from the peripheral side faces. Furthermore, the formation of the coat layer makes it easier to improve the peripheral accuracy (dimensional accuracy of peripheral side faces) of the honeycomb structure.

In the honeycomb structure according to the embodiments of the present invention, composition of the second plug is almost the same as composition of the coat layer.

When the composition of the second plug is almost the same as the composition of the coat layer, as described above, an inner stress caused by a difference between the thermal expansion coefficients of the component members is less likely to occur, leading to further improvement of the reliability.

In the honeycomb structure according to the embodiments of the present invention, composition of the first plug is almost the same as composition of the honeycomb fired body.

When the composition of the first plug is almost the same as the composition of the honeycomb fired body, as described above, an inner stress caused by a difference between the thermal expansion coefficients of the component members is less likely to occur, leading to further improvement of the reliability. In particular, even under a high temperature close to about 1000° C., the honeycomb structure is less likely to deteriorate, and tends to maintain sufficient strength and superior reliability.

Moreover, in the honeycomb structure according to the embodiments of the present invention, the composition of each plug is almost the same as the composition of either of the adhesive layer, the coat layer or the honeycomb fired body. For this reason, upon manufacturing the honeycomb structure, it is not necessary to separately prepare the plug material pastes to be used for forming the plugs.

The honeycomb structure according to the embodiments of the present invention, the plurality of cells formed in the honeycomb fired body include large-capacity cells each having a comparatively larger cross-section perpendicular to the longitudinal direction, and small-capacity cells each having a comparatively smaller cross-section, the large-capacity cell having the first plug formed therein, the small-capacity cell having the second plug formed therein.

The honeycomb structure having such cells has a configuration suitable for capturing a large amount of PM as well as suppressing an increase in the pressure loss.

The exhaust gas purifying apparatus according to embodiments of the present invention is the exhaust gas purifying apparatus provided with the honeycomb structure placed in a metal casing with a holding sealing member interposed therebetween, the honeycomb structure including a honeycomb block including a honeycomb fired body having a plurality of cells placed longitudinally in parallel with one another with a cell wall interposed therebetween and each having an end portion sealed with a plug formed by a plug material paste at either one end, wherein the plugs include fired first plugs on one end face side of the honeycomb fired body and unfired second plugs on an other end face side of the honeycomb fired body, wherein the honeycomb structure is placed in an orientation with the end face having the first plugs formed therein on an exhaust-gas outlet side and the end face having the second plugs formed therein on an exhaust-gas inlet side.

The exhaust gas purifying apparatus according to the embodiments of the present invention is provided with the honeycomb structure according to the embodiments of the present invention as a honeycomb structure. The first plugs (fired plugs) are located on the exhaust-gas outlet side and the second plugs (unfired plugs) are located on the exhaust-gas inlet side. This makes it easier to alleviate a thermal stress caused by high-temperature exhaust gases on the exhaust-gas inlet side, and prevent cracks in the plugs and peeling between the honeycomb fired body and the plugs on the exhaust-gas outlet side where temperature raises much higher in a regenerating process.

The method for manufacturing a honeycomb structure according to embodiments of the present invention includes molding a ceramic raw material to manufacture a honeycomb molded body having a plurality of cells longitudinally placed in parallel with one another with a cell wall interposed therebetween; injecting a plug material paste to seal cells at predetermined positions on each end face of the honeycomb molded body; firing the honeycomb molded body to manufacture a honeycomb fired body having first plugs formed therein; and manufacturing a honeycomb block including at least one of the honeycomb fired bodies, and further includes: cutting the honeycomb fired body having the first plugs formed at predetermined positions; forming second plugs by injecting a plug material paste into end portions of the cells of the cut honeycomb fired body at predetermined positions, and solidifying the plug material paste through heating, the second plugs formed on a side opposite to the side having the first plugs formed thereon.

The method for manufacturing a honeycomb structure according to the embodiments of the present invention makes it easier to suitably manufacture the honeycomb structure according to the embodiments of the present invention.

Moreover, in the method for manufacturing a honeycomb structure according to the embodiments of the present invention, after a honeycomb fired body is manufactured by firing a honeycomb molded body, the resulting honeycomb fired body is cut.

Since the honeycomb fired body is cut after being fired as described above, it may become easier to manufacture honeycomb fired bodies with high dimensional accuracy in the longitudinal direction and a smaller variation in the size.

Moreover, the method for manufacturing a honeycomb structure according to the embodiments of the present invention is particularly suitable for manufacturing a honeycomb structure that has a short length in the longitudinal direction.

In the method for manufacturing a honeycomb structure, the honeycomb molded body is housed in the firing jig and then fired. As described above, when a firing jig having a certain size is used, the smaller honeycomb molded bodies are used, the lower the productivity thereof becomes.

In contrast, in the method for manufacturing a honeycomb structure according to the embodiments of the present invention, the honeycomb fired body having a predetermined length is manufactured by firing the honeycomb molded body and then cutting the obtained honeycomb fired body.

For this reason, even when a honeycomb structure having a short length is manufactured, superior productivity can be achieved.

For example, even when a honeycomb structure having a almost a half length of a general length in the longitudinal direction is manufactured, the same firing jig as that generally used can be used.

Therefore, the honeycomb fired body is preferably cut into two almost equal pieces. Needless to say, the honeycomb fired body may be cut into three or more pieces. When cut into three or more pieces, the honeycomb fired bodies located at a position other than the two ends (located at the center) may be used for manufacturing another honeycomb structure.

The method for manufacturing a honeycomb structure according to the embodiments of the present invention includes cutting the honeycomb fired body after manufacturing the honeycomb fired body having the first plugs formed therein; and manufacturing the honeycomb block after forming the second plugs.

The method for manufacturing a honeycomb structure according to the embodiments of the present invention includes manufacturing the honeycomb block by using a single honeycomb fired body.

The method for manufacturing a honeycomb structure according to the embodiments of the present invention includes manufacturing the honeycomb block by combining a plurality of honeycomb fired bodies with one another with an adhesive layer interposed therebetween.

The method for manufacturing a honeycomb structure according to the embodiments of the present invention includes manufacturing a honeycomb block having the first plugs formed at both ends thereof by manufacturing the honeycomb fired bodies having the first plugs formed therein and then combining a plurality of the honeycomb fired bodies with one another with an adhesive layer interposed therebetween; and forming the second plugs at an opposite end of the honeycomb block to the end having the first plugs formed, after cutting the honeycomb block having the honeycomb fired bodies combined with one another with the adhesive layer interposed therebetween.

In the method for manufacturing a honeycomb structure according to the embodiments of the present invention, composition of the second plug is almost the same as composition of the adhesive layer.

When the composition of the second plug is almost the same as the composition of another component member of the honeycomb structure, as described above, an inner stress caused by a difference between the thermal expansion coefficients of the component members is less likely to occur in the honeycomb structure thus manufactured.

The method for manufacturing a honeycomb structure according to the embodiments of the present invention includes manufacturing the honeycomb fired body to have the plurality of cells including large-capacity cells each having a comparatively larger cross-section perpendicular to the longitudinal direction and small-capacity cells each having a comparatively smaller cross-section, forming the first plugs in the large-capacity cells, and forming the second plugs in the small-capacity cells.

The method for manufacturing a honeycomb structure according to the embodiments of the present invention makes it easier to manufacture a honeycomb structure that has a configuration suitable for capturing a large amount of PM as well as suppressing an increase in the pressure loss.

The method for manufacturing a honeycomb structure according to the embodiments of the present invention includes forming a coat layer by applying a coating material paste to a periphery of the honeycomb block and solidifying the coating material paste after manufacturing the honeycomb block.

As described above, the formation of the coat layer on the periphery of the honeycomb block makes it easier to manufacture a honeycomb structure having further improved reliability. Moreover, the formation of the coat layer makes it easier to manufacture a honeycomb structure having a high peripheral accuracy (dimensional accuracy of the peripheral side face).

In the method for manufacturing a honeycomb structure according to the embodiments of the present invention, composition of the second plug is almost the same as composition of the coat layer.

When the composition of the second plug is almost the same as the composition of another component member of the honeycomb structure, as described above, an inner stress caused by a difference between the thermal expansion coefficients of the component members is less likely to occur in the honeycomb structure thus manufactured.

In the method for manufacturing a honeycomb structure according to the embodiments of the present invention, the plug material paste used for forming the second plug contains at least inorganic particles and an inorganic binder.

Such a plug material paste is particularly suitable for forming the second plugs (unfired plugs), because the plug material paste has superior adhesiveness with the cell wall and a required strength.

In the method for manufacturing a honeycomb structure according to the embodiments of the present invention, composition of the first plug is almost the same as composition of the honeycomb fired body.

When the composition of the first plug is almost the same as the composition of another component member of the honeycomb structure, as described above, an inner stress caused by a difference between the thermal expansion coefficients of the component members is less likely to occur in the honeycomb structure thus manufactured. In particular, even under a high temperature close to about 1000° C., the honeycomb structure is less likely to deteriorate, and tends to maintain sufficient strength and superior reliability.

Moreover, in the method for manufacturing a honeycomb structure according to the embodiments of the present invention, the composition of each plug is almost the same as the composition of either of the adhesive layer, the coat layer and the honeycomb fired body. For this reason, upon manufacturing the honeycomb structure, it is not necessary to separately prepare the plug material paste, and a wet mixture to be used for forming the adhesive paste, the coating material paste or the honeycomb molded body may be used as the plug material paste.

The following description will discuss embodiments of the present invention.
(First Embodiment)

First, the following description will discuss a method for manufacturing a honeycomb structure according to the present embodiment in the order of processes.

FIGS. 1A, 1B, 1C, 1D, 1E, 1F, 1G and 1H are explanatory views each illustrating manufacturing processes of a first embodiment of the present invention.

(1) As a ceramic raw material, silicon carbide powders having different average particle diameters are used and mixed with an organic binder, a plasticizer, a lubricant and water to prepare a wet mixture.

(2) The wet mixture is charged into an extrusion-molding apparatus and extrusion-molded to form a honeycomb molded body 130 having a predetermined shape (see FIG. 1A). Here, an extrusion-molding metal die that forms each cell 121 into a predetermined shape is selected.

Here, the honeycomb molded body 130 is manufactured to have a longitudinal length almost twice as long as a designed value of a longitudinal length of a honeycomb structure to be manufactured. At this time, the length of the honeycomb molded body is determined in consideration of the amount of shrinkage at the time of firing and a cutting margin to be cut out.

Moreover, the honeycomb molded body is dried by using a drying apparatus.

(3) Next, a predetermined amount of a plug material paste 122 is injected into a predetermined end portion of each cell 121 of the honeycomb molded body 130 to seal the respective cells 121. Upon sealing the cells, a sealing mask is applied to an end face of the honeycomb molded body, and the plug material paste is injected only into the cells needed to be sealed (see FIG. 1B).

Here, the plug material paste is injected in such a manner that in a honeycomb structure to be manufactured at the end the cells are sealed in a checkered pattern on each end face and each cell is sealed only at either one end thereof.

Here, a composition having almost the same composition as that of the wet mixture (almost the same composition as that of the honeycomb molded body) is used as the plug material paste.

Although the plug material paste may have the same composition as that of the wet mixture, for example, the viscosity thereof may be adjusted in consideration of the filling property thereof to fill the cells. The adjustment of the viscosity may be carried out by changing the blending amount of the organic solvent, water or the like.

(4) After the honeycomb molded body 130 having cells each being sealed at a predetermined end is placed on a firing jig, a degreasing treatment is carried out to remove the organic components in the honeycomb molded body 130 by heating the honeycomb molded body 130 in a degreasing furnace.

Figure 1C:
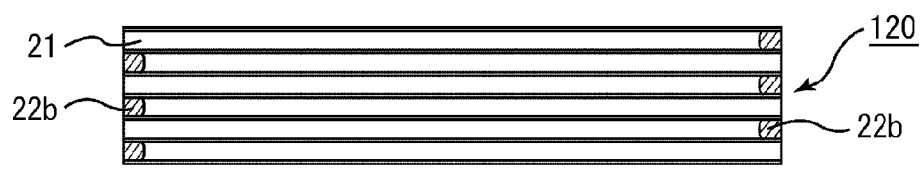

Subsequently, the degreased honeycomb molded body is charged into a firing furnace while being on the firing jig, and a firing treatment is carried out at a predetermined temperature (for example, at least about 2200° C. and at most about 2300° C.) to manufacture a honeycomb fired body 120 (see FIG. 1C).

Here, in the embodiment of the present invention, plugs 22b formed through the firing treatment is referred to as first plugs.

Moreover, in the embodiment of the present invention, a "honeycomb molded body" includes a molded body on which the drying treatment or the degreasing treatment has been carried out in addition to a raw molded body immediately after being extrusion-molded.

Figure 1D:
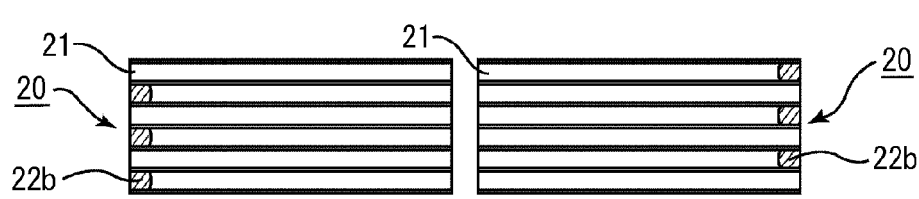

(5) Next, the honeycomb fired body 120 manufactured in the process (4) is cut into two pieces having an equal longitudinal length to obtain honeycomb fired bodies 20 (see FIG. 1D).

The honeycomb fired body is cut by using a diamond cutter, an OD (outside diameter) diamond blade, an ID (inner diameter) diamond blade, a multi-wire, a multi-blade or the like.

By carrying out such a cutting treatment, the honeycomb fired bodies 20, which have a longitudinal length equal to a designed value of a longitudinal length of a honeycomb structure to be manufactured, can be manufactured.

Here, in the honeycomb fired body 20 obtained by cutting, only predetermined cells are sealed on one end face side.

(6) Next, in the honeycomb fired body manufactured in the process (5), the plug material paste is injected into end portions of predetermined cells on the unsealed end of the honeycomb fired body to seal each cell at either one end thereof.

Here, as the plug material paste to be injected, for example, a plug material paste containing an inorganic binder, an organic binder and inorganic particles is used. The plug material paste may further contain at least one of inorganic fibers and whiskers.

Figure 1E:
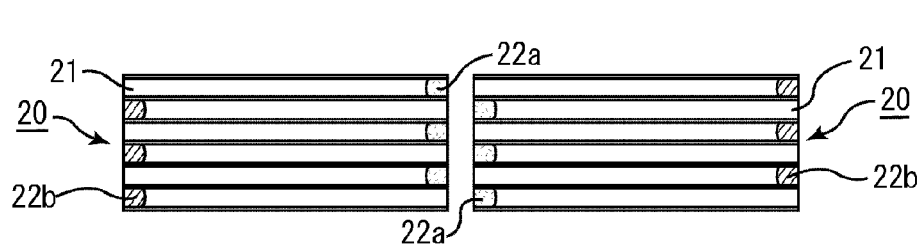

Next, the plug material paste injected in the process is solidified by heating, and formed into unfired plugs (solidified plugs) 22a (see FIG. 1E). Here, in the embodiment of the present invention, the unfired (solidified) plugs are referred to as second plugs.

Here, the plug material paste injected in the process (3) is formed into the fired plugs 22b through the firing treatment in the process (4).

(7) Next, an adhesive paste for forming an adhesive layer is applied to side faces of the honeycomb fired bodies 20 having the cells each being sealed at the predetermined end to form an adhesive paste layer. Repeatedly another honeycomb fired body is laminated on the adhesive paste layer to manufacture an aggregated body 110 of the honeycomb fired bodies in which a predetermined number of the honeycomb fired bodies 20 are combined with one another. Here, the honeycomb fired bodies are laminated so that the first plugs are all located on the same end face side (the second plugs are all located on the other end face side).

Here, as the adhesive paste, an adhesive paste having almost the same composition as that of the plug material paste injected in the process (6) is used.

Subsequently, the aggregated body 110 of the honeycomb fired bodies is heated so that the adhesive paste layer is solidified and formed into an adhesive layer 11 (see FIG. 1F and FIG. 1G).

Figure 1F:
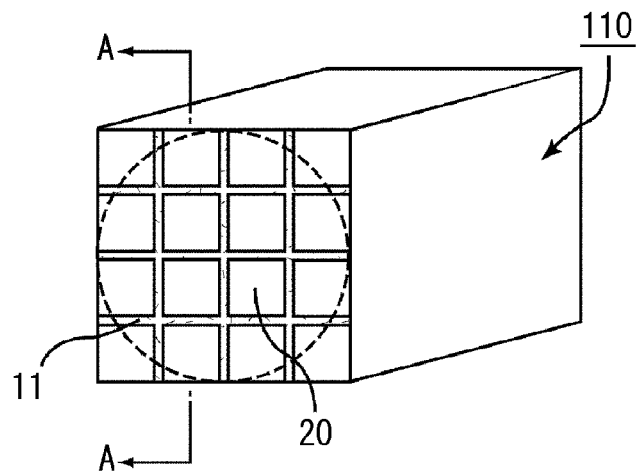
Figure 1G:
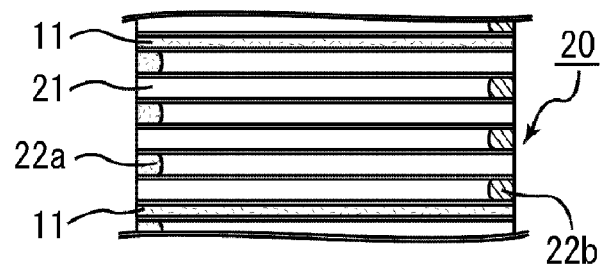
Figure 1H:
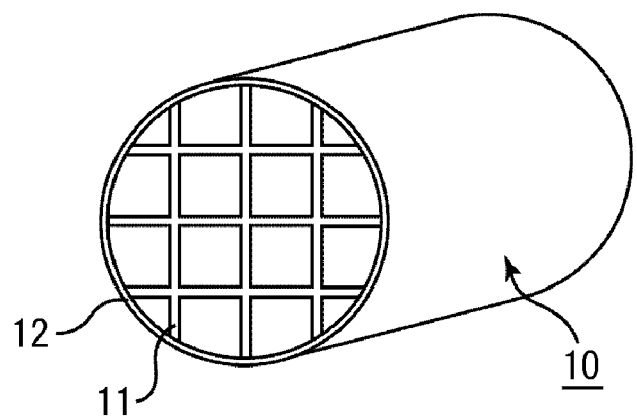

Here, FIG. 1G is a partially enlarged A-A line cross-sectional view of FIG. 1F.

(8) Thereafter, the aggregated body 110 of the honeycomb fired bodies is cut along a broken line in FIG. 1F by using a diamond cutter to form a honeycomb block. A coating material paste is applied to the periphery of the honeycomb block and solidified to form a coat layer 12. Thus, a honeycomb structure 10 is manufactured (see FIG. 1H).

Here, for example, a paste-form composition having almost the same composition as that of the adhesive paste is used as the coating material paste.

Next, with reference to the figures, the following description will discuss a honeycomb structure manufactured by such a manufacturing method.

Figure 2:
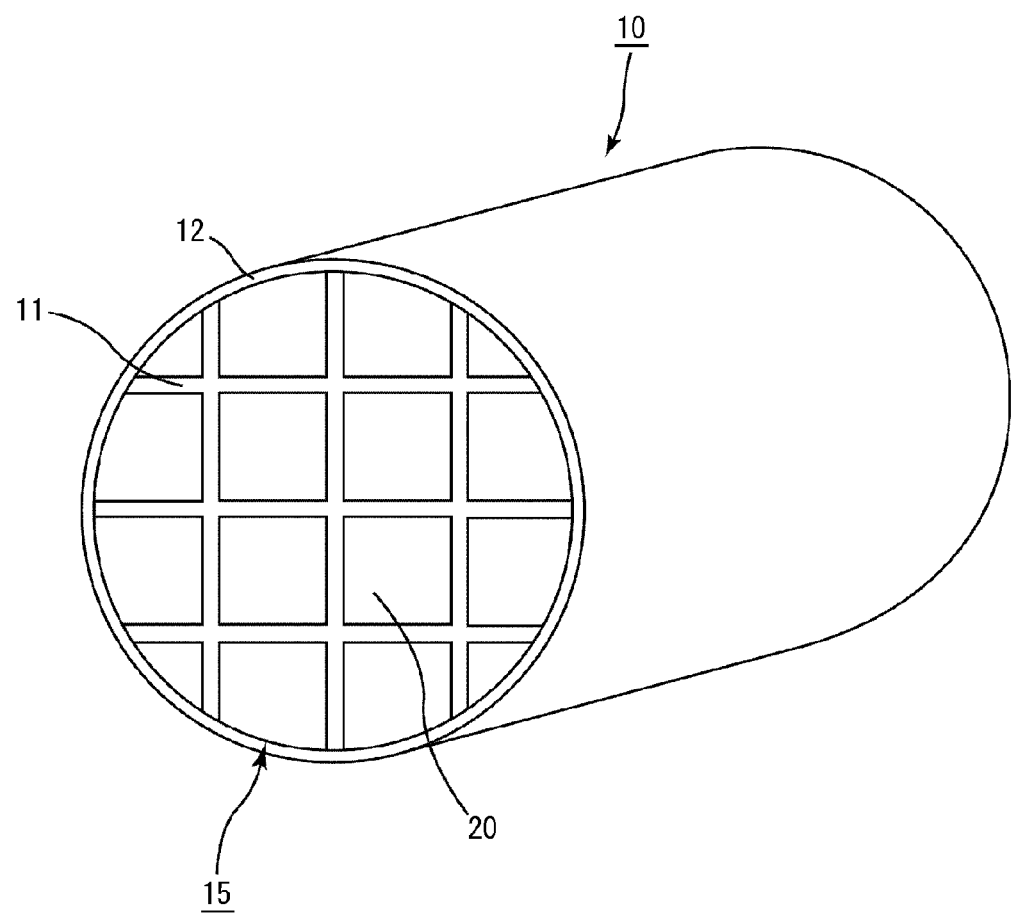
FIG. 2 is a perspective view schematically illustrating one example of a honeycomb structure of the first embodiment of the present invention.
Figure 3A:
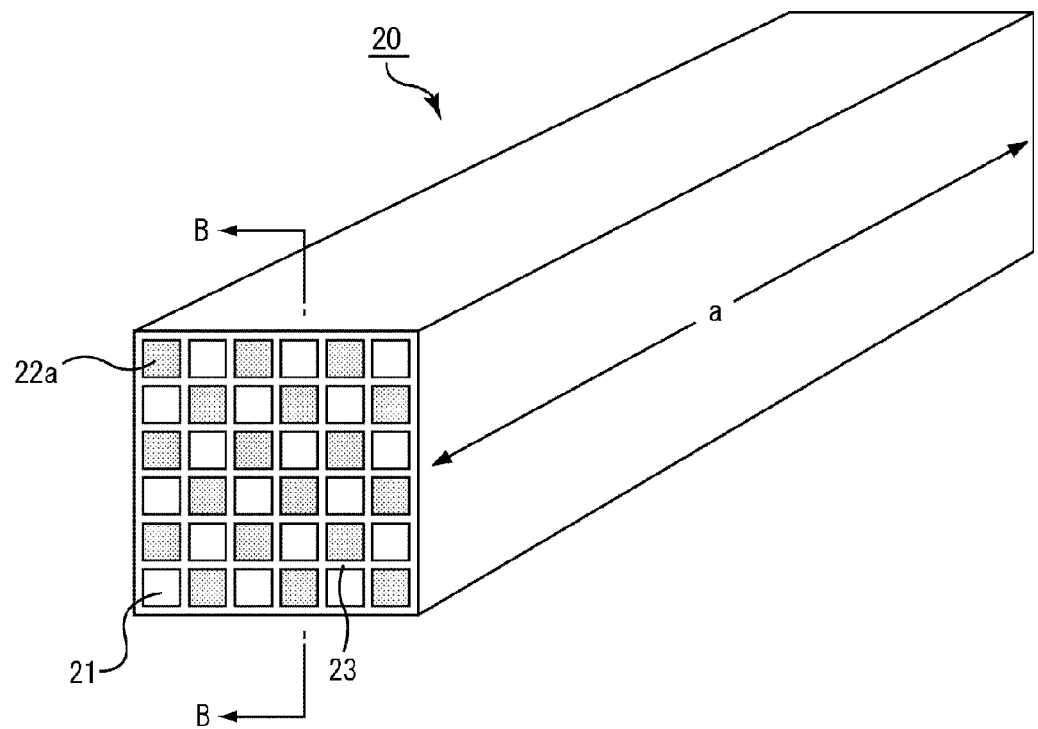
FIG. 3A is a perspective view schematically illustrating one example of a honeycomb fired body constituting the honeycomb structure of the first embodiment of the present invention.

FIG. 2 is a perspective view schematically illustrating one example of a honeycomb structure of the first embodiment of the present invention. FIG. 3A is a perspective view schematically illustrating one example of a honeycomb fired body constituting the honeycomb structure of the first embodiment of the present invention, and FIG. 3B is a B-B line cross-sectional view of FIG. 3A.

In the honeycomb structure 10 of the present embodiment, as shown in FIG. 2, the plurality of honeycomb fired bodies 20 are combined with one another with the adhesive layer 11 interposed therebetween to form a honeycomb block 15. Additionally, the coat layer 12 is formed on the periphery of the honeycomb block 15.

Figure 3B:
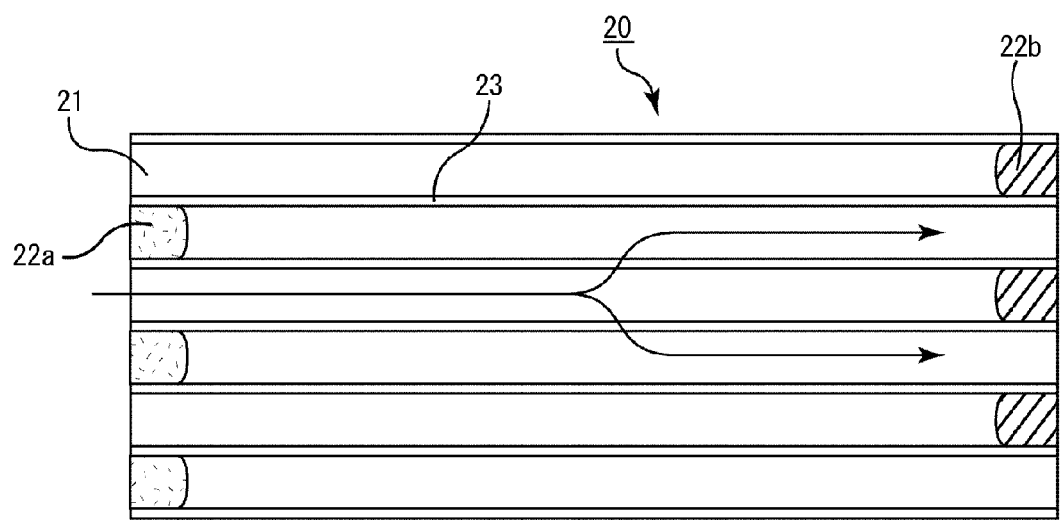
FIG. 3B is a B-B line cross-sectional view of FIG. 3A.

Moreover, as shown in FIGS. 3A and 3B, the honeycomb fired body 20 has a configuration in which a large number of cells 21 are placed in parallel with one another in the longitudinal direction (direction of arrow a in FIG. 3A). The cell wall 23 partitioning the cells 21 functions as a filter.

That is, as shown in FIG. 3B, each of the cells 21 formed in the honeycomb fired body 20 is sealed either on the exhaust-gas inlet side with the plug 22a formed by the plug material paste, or on the exhaust-gas outlet side with the plug 22b formed by the plug material paste. Therefore, exhaust gases that have flowed in one cell 21 having a sealed end on the exhaust-gas outlet side, are discharged from another cell 21 having a sealed end on the exhaust-gas inlet side, after having always passed through the cell wall 23 partitioning the cells 21. When the exhaust gases pass through the cell wall 23, PM is captured in the cell wall 23 so that the exhaust gases are purified.

Here, the plugs 22b which seal the end portions on the exhaust-gas outlet side are plugs (first plugs) formed by carrying out the firing treatment on the plug material paste. In contrast, the plugs 22a which seal the end portions on the exhaust-gas inlet side are unfired plugs (second plugs) formed by solidifying the plug material paste without carrying out the firing treatment thereon.

Moreover, in the honeycomb structure 10, the coat layer 12 and the plugs 22a are formed by using almost the same paste as the paste used for forming the adhesive layer 11.

Here, in FIG. 3B, arrows indicate exhaust gas flows.

As described above, in the honeycomb structure 10, the plugs 22b are formed through the firing treatment and the plugs 22a are formed without carrying out the firing treatment thereon. Therefore, the plugs 22b and the plugs 22a have mutually different mechanical properties such as hardness (for example, Vickers hardness, Rockwell hardness and the like), strength (bending strength, compression strength, breaking strength and the like), Young's modulus, elastic modulus, and thermal conductivity.

In the embodiment of the present invention, plugs having a low strength and a low thermal conductivity are formed on one end of the honeycomb structure, and plugs having a high strength and a high thermal conductivity are formed on the other end of the honeycomb structure. The honeycomb structure is preferably placed so that end portions with the plugs having a low strength and a low thermal conductivity are located on an inlet side of an exhaust gas purifying apparatus and end portions with the plugs having a high strength and a high thermal conductivity are located on an outlet side of the exhaust gas purifying apparatus.

In the present description, the firing refers to a process in which instable components (moisture, binder, and the like) in the molded body are decomposed and removed, and reactions among the respective components (including recrystallizing) are allowed to progress to form a stable compound. The firing further improves the strength. In contrast, the solidification refers to a process in which, by removing moisture and the like in the composition, the state of the composition is changed by physical actions to exert an adhesive property (to improve the hardness of the composition) without allowing any reactions among the respective components in the composition to take place.

Next, with reference to the figures, the following description will discuss an exhaust gas purifying apparatus provided with such a honeycomb structure.

Figure 4:
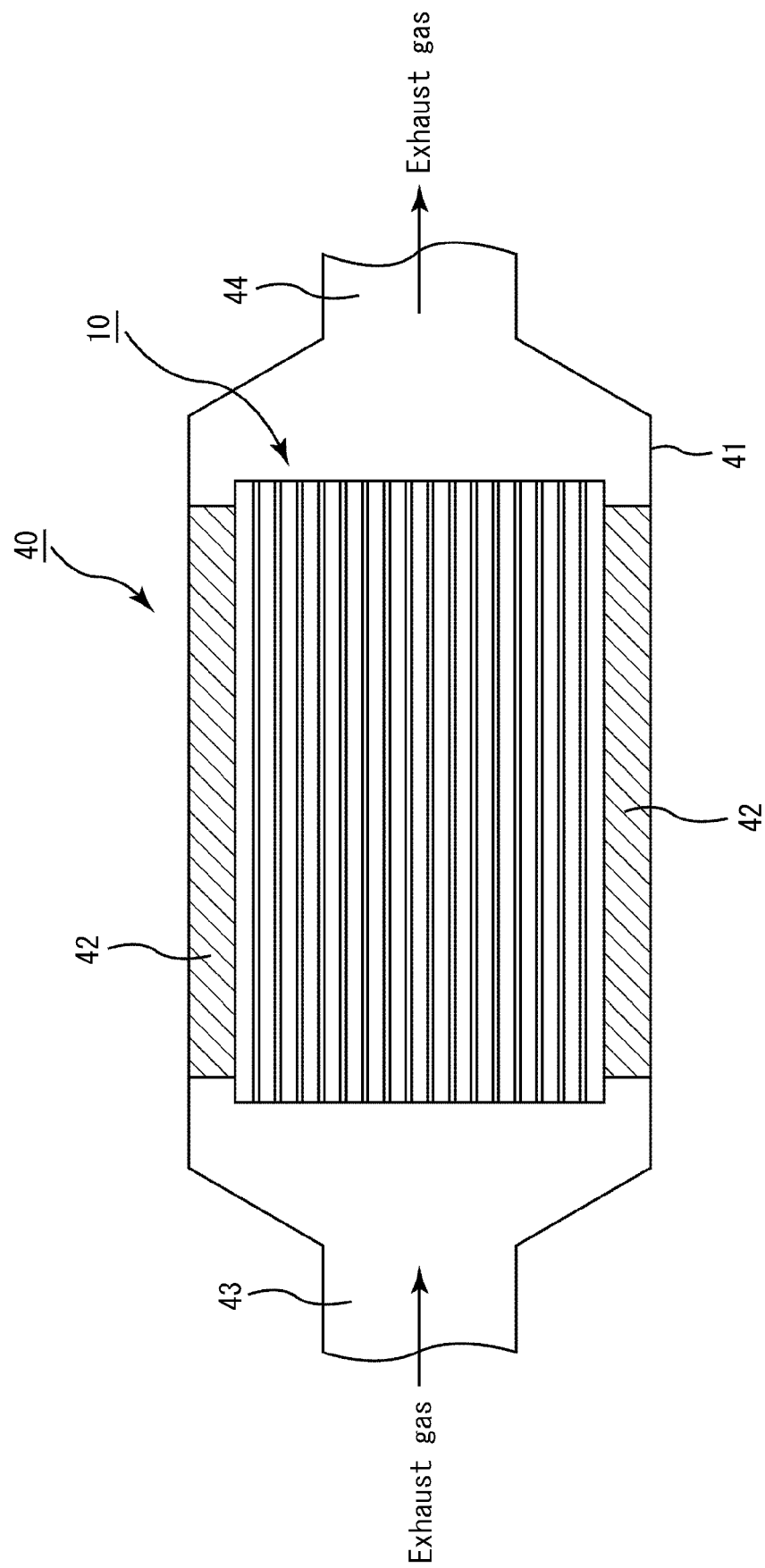
FIG. 4 is a cross-sectional view schematically illustrating one example of an exhaust gas purifying apparatus of the first embodiment of the present invention in which a honeycomb structure according to the first embodiment of the present invention is installed.

FIG. 4 is a cross-sectional view schematically illustrating one example of an exhaust gas purifying apparatus of the first embodiment of the present invention in which a honeycomb structure according to the embodiments of the present invention is installed.

As shown in FIG. 4, an exhaust gas purifying apparatus 40 is mainly configured by a honeycomb structure 10, a casing (metal container) 41 that covers the outside of the honeycomb structure 10 and a holding sealing material 42 made of alumina interposed between the honeycomb structure 10 and the casing 41, and an introducing pipe 43 coupled to an internal combustion engine such as an engine, is connected to an end of the casing 41 on the side from which exhaust gases are introduced, and an exhaust pipe 44 coupled to the outside is connected to the other end of the casing 41.

Here, the honeycomb structure 10 is installed in the casing 41 so that the side on which the plugs 22a (unfired plugs) are formed is located on the exhaust-gas inlet side, and the side on which the plugs 22b (fired plugs) are formed is located on the exhaust-gas outlet side. Therefore, in the exhaust gas purifying apparatus 40, the plugs 22b having higher mechanical properties are located on the exhaust-gas outlet side.

Here, in FIG. 4, arrows indicate exhaust-gas flows.

In the exhaust gas purifying apparatus 40 having such a configuration, exhaust gases discharged from the internal combustion engine such as an engine are introduced into the casing 41 through the introducing pipe 43, and allowed to flow into the honeycomb structure 10 from the cells having an opening on the inlet side. Thereafter, the exhaust gases pass through the cell wall, and PM is captured in the cell wall to purify the exhaust gases. Then, the purified gases are discharged out of the honeycomb structure from the cells having an opening on the outlet side, and discharged the outside through the exhaust pipe 44.

When a large amount of PM is accumulated on the cell walls of the honeycomb structure 10 to cause an increase in the pressure loss, a regenerating process of the honeycomb structure 10 is carried out.

In the regenerating process, gases heated by a heater (not shown) are allowed to flow in the cells of the honeycomb structure. Thereby, the honeycomb structure 10 is heated, and the PM accumulated on the cell walls are burned and eliminated. Alternatively, the PM may be burned and eliminated by using a post-injection system.

In particular, the exhaust-gas outlet side of the honeycomb structure tends to have a larger amount of PM accumulated thereon than that on the exhaust-gas inlet side, and upon burning and eliminating the PM, temperature tends to rise higher on the exhaust-gas outlet side of the honeycomb structure compared to the exhaust-gas inlet side. Therefore, in the present embodiment, the plugs having higher mechanical properties are located on the exhaust-gas outlet side where temperature tends to rise higher, while the plugs having lower mechanical properties are located on the exhaust-gas inlet side.

The following description will explain the effects of the first embodiment of the present invention.

(1) In the present embodiment, upon manufacturing a honeycomb structure, after the firing treatment is carried out on a honeycomb molded body to manufacture a honeycomb fired body, the resulting honeycomb fired body is cut.

By carrying out the cutting treatment after the firing treatment as described above, it may become easier to manufacture honeycomb fired bodies each having superior dimensional accuracy in the longitudinal direction, thus leading to a smaller variation in the size of the honeycomb fired bodies. Therefore, the present embodiment can be suitably used for manufacturing a honeycomb structure that has little irregularity on the end faces thereof and does not particularly need a grinding treatment.

More specifically, a fired body may be formed to have a dimension larger than the designed value, and the fired body is cut at positions the designed value from the respective end faces to obtain two pieces of honeycomb fired bodies. Here, the center portion may be designed to be eliminated in the cutting treatment, or may be discarded as a cutting margin. Alternatively, in the case where the center portion of the honeycomb fired body is not discarded, this portion may be used for manufacturing another honeycomb structure.

Moreover, in the present embodiment, since the manufactured fired body is cut to have the dimension of the designed value, a grinding treatment does not need to be carried out on the end faces. Therefore, no grinding powders remain in the pores in the cell walls of the honeycomb fired body, and no washing treatment following the end-face grinding treatment is required.

Moreover, since after a honeycomb fired body is manufactured, the resulting honeycomb fired body is cut, two honeycomb fired bodies can be manufactured from a single honeycomb molded body. Therefore, it may become easier to efficiently manufacture honeycomb fired bodies. As a result, the productivity of the honeycomb structure is improved, and the number of honeycomb structures manufactured per unit time tends to be increased, leading to a reduction in the manufacturing costs.

(2) In the present embodiment, since after a plug material paste is injected, the plugs for sealing the predetermined end of each cell are formed by carrying out the firing treatment on the plug material paste or solidifying the plug material paste by heating, the predetermined end of each cell tends to be positively sealed.

(3) In the present embodiment, since a coat layer is formed on the periphery of the honeycomb structure, it may become easier to prevent PM leakage from the peripheral side faces of the honeycomb structure when the honeycomb structure is used for purifying exhaust gases, leading to improvement of the reliability. Moreover, the formation of the coat layer tends to improve the dimensional accuracy of the peripheral side faces of the honeycomb structure.

(4) In the present embodiment, since the unfired plugs, the adhesive layer and the coat layer which constitute the honeycomb structure are formed by using almost the same material, an inner stress caused by a difference between the thermal expansion coefficients of the component members in the honeycomb structure is less likely to occur, making it possible to further improve the reliability.

Moreover, the fired plugs constituting the honeycomb structure are formed by using almost the same composition as that of the honeycomb fired body. Therefore, even upon occurrence of a thermal impact during the regenerating process, cracks, peeling and the like are less likely to occur between the cell walls and the plugs, thereby making it easier to improve the reliability and also to positively prevent leakage of soot.

(5) In an exhaust gas purifying apparatus of the present embodiment, since the plugs formed through the firing treatment (first plugs) are located on the exhaust-gas outlet side and the plugs formed without carrying out the firing treatment (second plugs) are located on the exhaust-gas inlet side, the above-mentioned effect described in (4) is most effectively exerted. Therefore, it is possible to easily alleviate an inner stress caused by high temperature exhaust gases on the exhaust-gas inlet side. On the exhaust-gas outlet side, although a large amount of PM tends to accumulate and the temperature tends to rise upon carrying out the regenerating process, the fired plugs tend to prevent occurrence of cracks between the cell walls and the plugs, thereby making it easier to positively capture PM.

Hereinafter, an example that discloses the first embodiment of the present invention more specifically is shown, but the present invention is not limited to this example.

EXAMPLE 1

(1) An amount of 52.8% by weight of a silicon carbide coarse powder having an average particle diameter of 22 μm and an amount of 22.6% by weight of a silicon carbide fine powder having an average particle diameter of 0.5 μm were mixed, and to the obtained mixture were added 2.1% by weight of an acrylic resin, 4.6% by weight of an organic binder (methyl cellulose), 2.8% by weight of a lubricant (UNILUB, manufactured by NOF Corp.), 1.3% by weight of glycerin, and 13.8% by weight of water, and then mixed and kneaded to obtain a wet mixture. The wet mixture was then extrusion-molded to provide raw honeycomb molded bodies having almost the same shape as that shown in FIG. 3A with its cells unsealed.

(2) Subsequently, the raw honeycomb molded bodies were dried by using a microwave drying apparatus to obtain dried honeycomb molded bodies. Thereafter, predetermined cells of the dried honeycomb molded bodies were filled in with a paste having the same composition as that of the wet mixture. Specifically, a paste having the same composition as that of the wet mixture was injected to seal each cell at either one end thereof. Thereafter, the honeycomb molded bodies were dried again by the drying apparatus.

(3) Next, after the dried honeycomb molded bodies were placed on a firing jig, and then degreased at a temperature of 400° C. Thereafter, a firing treatment was carried out at a temperature of 2200° C. under a normal-pressure argon atmosphere for 3 hours to manufacture honeycomb fired bodies including a silicon carbide sintered body. The manufactured honeycomb fired bodies had a porosity of 45%, an average pore diameter of 15 μm, a size of 34.3 mm×34.3 mm×300.5 mm, the number of cells (cell density) of 300 pcs/inch2 and a thickness of a cell wall of 0.25 mm (10 mil).

(4) Next, each of the honeycomb fired bodies were cut into two equal pieces by using an OD diamond blade having a board thickness of 0.5 mm to obtain honeycomb fired bodies having a size of 34.3 mm×34.3 mm×150 mm. In the obtained honeycomb fired bodies, predetermined cells are sealed only at either one end thereof.

(5) In the honeycomb fired bodies obtained in the process (4), a plug material paste was injected to end portions of unsealed cells to seal each cell at either one end thereof.

Here, as the plug material paste, a plug material paste containing 30.0% by weight of a silicon carbide powder having an average particle diameter of 0.6 μm, 21.4% by weight of silica sol, 8.0% by weight of carboxymethyl cellulose and 40.6% by weight of water was used.

Thereafter, the plug material paste injected in the process was solidified by heating with a hot air at 180° C. for 15 minutes to form plugs.

(6) Next, an adhesive paste was applied to side faces of the honeycomb fired bodies manufactured through the processes (1) to (5), and 16 pieces of the honeycomb fired bodies were bonded to one another with the adhesive paste interposed therebetween. Furthermore, the adhesive paste was solidified by heating at 180° C. for 20 minutes to manufacture a rectangular pillar-shaped aggregated body of the honeycomb fired bodies. Subsequently, the periphery of the aggregated body of the honeycomb fired bodies was cut by using a diamond cutter to manufacture a round pillar-shaped honeycomb block with the adhesive layer having a thickness of 1 mm.

Here, as the adhesive paste, a paste having the same composition as that of the plug material paste used in the process (5) was used.

(7) Next, a coating material paste was applied to the periphery of the honeycomb block to form a coating material paste layer. Then, the coating material paste layer was solidified at 120° C. to manufacture a round pillar-shaped honeycomb structure having a size of 143.8 mm in diameter×150 mm in length with a coat layer formed on the periphery.

Here, a paste having the same composition as that of the plug material paste used in the process (5) was used as the coating material paste.

COMPARATIVE EXAMPLE 1

(1) Raw honeycomb molded bodies having almost the same shape as that shown in FIG. 3A with its cells unsealed were manufactured by following the same procedure as in the process (1) of Example 1, except that the manufactured raw honeycomb molded bodies were designed to have a length of 150 mm after being fired.

(2) Next, the raw honeycomb molded bodies were dried by using a microwave drying apparatus to form dried honeycomb molded bodies. Thereafter, a plug material paste was injected to end portions of predetermined cells to seal each cell at either one end thereof.

Here, a composition having the same composition as that of the wet mixture was used as the plug material paste.

(3) Next, the degreasing treatment and the firing treatment were carried out on the honeycomb molded bodies with the plug material paste filled therein under the same conditions as those in the process (3) of Example 1 to manufacture honeycomb fired bodies.

Here, each of the manufactured honeycomb fired bodies includes a silicon carbide sintered body and has a porosity of 45%, an average pore diameter of 15 μm, a size of 34.3 mm×34.3 mm×150 mm, the number of cells (cell density) of 300 pcs/inch2 and a thickness of a cell wall of 0.25 mm (10 mil).

(4) Next, by using the honeycomb fired bodies manufactured in the process (3), a honeycomb structure including a plurality of the honeycomb fired bodies combined with one another with an adhesive layer interposed therebetween was manufactured by following the same method as in the processes (6) and (7) of Example 1.

(Evaluation of Honeycomb Structure)
(1) Measurement of Pressure Loss

An exhaust gas purifying apparatuses 40 shown in FIG. 4 was assembled using each of the honeycomb structures manufactured in Example 1 and Comparative Example 1. Then, a 2 L common-rail-type diesel engine was coupled to an introduction pipe 43 of the exhaust gas purifying apparatus 40. Pressure gauges were attached in front of and behind the honeycomb structure.

The engine was driven at the number of revolutions of 1500 min-1 and a torque of 50 Nm. A pressure difference was measured five minutes after the start of the driving operation.

The results showed that the pressure loss of the honeycomb structure of Example 1 was 2.3 kPa, and the pressure loss of the honeycomb structure of Comparative Example 1 was 2.4 kPa.

Accordingly, the honeycomb structure manufactured in Example 1 showed the similar degree of the pressure loss to that of the honeycomb structure manufactured in Comparative Example 1 (conventional method).

(2) Measurement of Regeneration Limit Value

An exhaust gas purifying apparatuses 40 shown in FIG. 4 was assembled using each of the honeycomb structures manufactured in Example 1 and Comparative Example 1. Then, a 2 L common-rail-type diesel engine was coupled to an introduction pipe 43 of the exhaust gas purifying apparatus 40.

An experiment in which the engine was driven at the number of revolutions of 2000 min-1 and a torque of 50 Nm for a predetermined time period and a regenerating process was carried out was successively conducted while increasing the time period of the operation, and the honeycomb structure (especially, the plugs) was observed whether cracks had occurred.

The amount of PM having been captured upon the occurrence of cracks was defined to be regeneration limit value.

The results showed that the regeneration limit value of the honeycomb structure of Example 1 was 7.9 g/l, and the regeneration limit value of the honeycomb structure of Comparative Example 1 was 7.7 g/l.

Accordingly, the honeycomb structure manufactured in Example 1 showed the similar degree of the regeneration limit value to that of the honeycomb structure manufactured in Comparative Example 1 (conventional method).

(Second Embodiment)

In the present embodiment, the sequence of the processes in the method for manufacturing a honeycomb structure is different from the sequence of the processes in the method for manufacturing a honeycomb structure of the first embodiment.

FIGS. 5A, 5B, 5C, 5D, 5E and 5F are explanatory views each illustrating manufacturing processes of the second embodiment of the present invention.

Figure 5A:
FIGS. 5A, 5B, 5C, 5D, 5E and 5F are explanatory views each illustrating manufacturing processes of the second embodiment of the present invention.

(1) In the method for manufacturing a honeycomb structure of the present embodiment, honeycomb fired bodies 120 are manufactured by following the same method as in the processes (1) to (4) in the method for manufacturing a honeycomb structure of the first embodiment of the present invention (see FIG. 5A).

(2) Next, an adhesive paste for forming an adhesive layer was applied to side faces of the manufactured honeycomb fired bodies 120 to form an adhesive paste layer. Repeatedly another honeycomb fired body is laminated on the adhesive paste layer to manufacture an aggregated body 110' of the honeycomb fired bodies in which a predetermined number of the honeycomb fired bodies 120 are combined with one another.

Here, as the adhesive paste, an adhesive paste having almost the same composition as that of a plug material paste used in the process (4) described below is used.

Figure 5B:
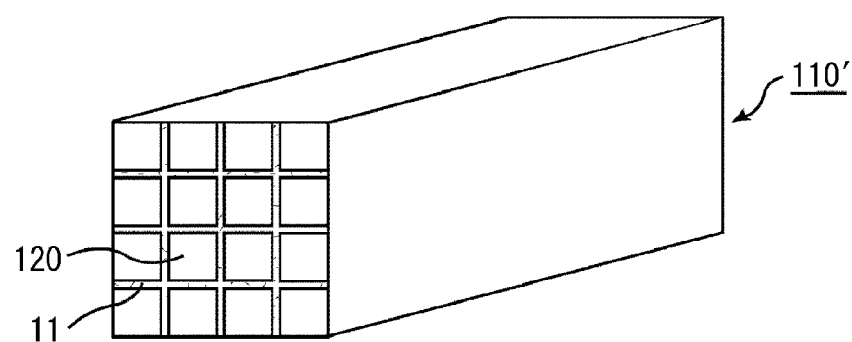

Further, in the process, after the honeycomb fired bodies were combined, the adhesive paste layer is solidified to form an adhesive layer 11 by heating the aggregated body of the honeycomb fired bodies (see FIG. 5B).

Figure 5C:
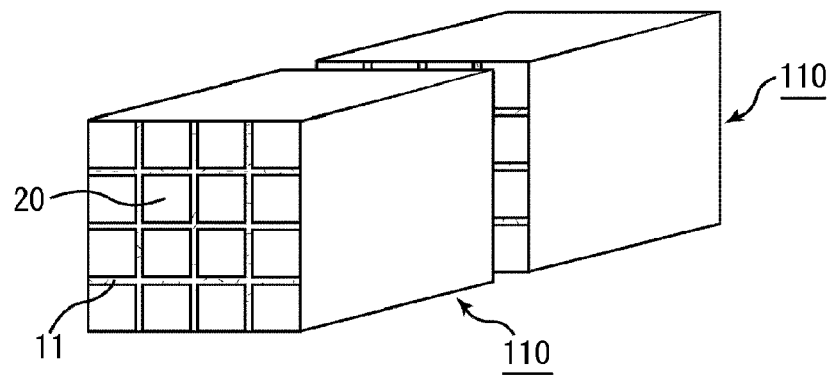

(3) Next, the aggregated body 110' of the honeycomb fired bodies manufactured in the process (2) is cut into two pieces having an equal longitudinal length to form aggregated bodies 110 of the honeycomb fired bodies (see FIG. 5C).

The honeycomb fired body is cut by using a diamond cutter, an OD diamond blade, an ID diamond blade, a multi-wire, a multi-blade or the like.

By carrying out such a cutting treatment, the aggregated bodies 110 of the honeycomb fired bodies, which have a longitudinal length equal to a designed value of a longitudinal length of a honeycomb structure to be manufactured, can be manufactured.

(4) Next, in the aggregated body 110 of the honeycomb fired bodies cut in the process (3), the plug material paste is injected to end portions of unsealed cells out of cells needed to be sealed so that each cell is sealed at either one end thereof.

Figure 5D:
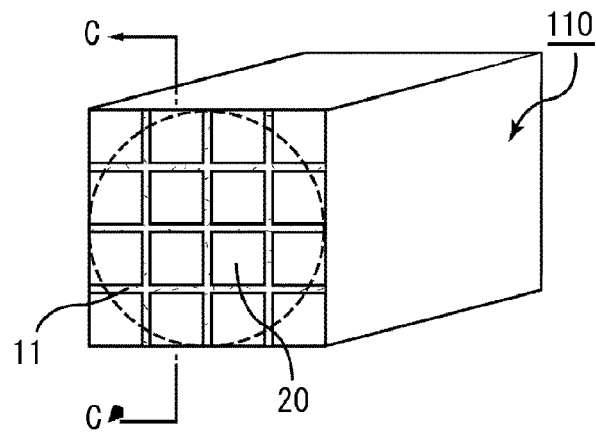
Figure 5E:
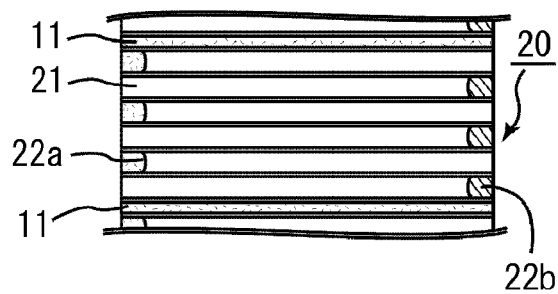
Figure 5F:
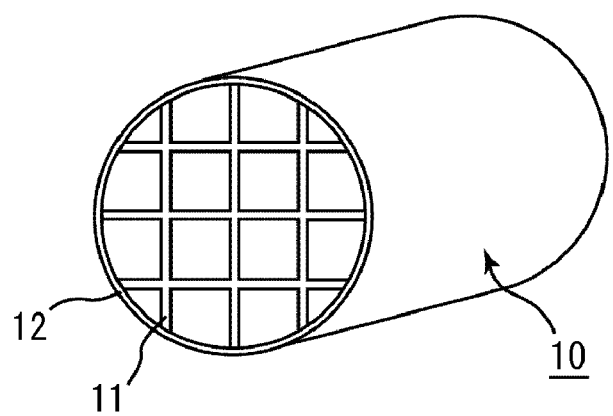

Thereafter, the injected plug material paste is solidified by heating to form plugs 22a (FIGS. 5D and 5E).

FIG. 5E is a partially enlarged C-C line cross-sectional view of FIG. 5D.

Here, as the plug material paste, for example, a plug material paste containing an inorganic binder, an organic binder and inorganic particles is used. The plug material paste may further contain at least one of inorganic fibers and whiskers.

(5) Thereafter, the aggregated body 110 of the honeycomb fired bodies is cut along a broken line in FIG. 5D by using a diamond cutter to form a honeycomb block. A coating material paste is applied to the periphery of the honeycomb block and solidified by heating to form a coat layer 12. Thus, a honeycomb structure 10 is manufactured (see FIG. 5F).

Here, as the coating material paste, for example, a coating material paste having almost the same composition as that of the plug material paste used in the process (4) is used.

In the present embodiment, a honeycomb structure can be manufactured through the processes as described above.

Here, the configuration of the honeycomb structure manufactured by the manufacturing method of the present embodiment is the same as the configuration of the honeycomb structure of the first embodiment of the present invention. The configuration of an exhaust gas purifying apparatus provided with the honeycomb structure manufactured by the manufacturing method of the present embodiment is the same as the configuration of the exhaust gas purifying apparatus of the first embodiment of the present invention.

The honeycomb structure, the exhaust gas purifying apparatus and the method for manufacturing a honeycomb structure according to the second embodiment of the present invention can exert the same effects as those of the first embodiment of the present invention.

Hereinafter, an example that discloses the second embodiment of the present invention more specifically is shown, but the present invention is not limited to the example.

EXAMPLE 2

(1) Honeycomb fired bodies including a silicon carbide sintered body and having a porosity of 45%, an average pore diameter of 15 µm, a size of 34.3 mm×34.3 mm×300.5 mm, the number of cells (cell density) of 300 pcs/inch2 and a thickness of a cell wall of 0.25 mm (10 mil) were manufactured by following the same procedure as in the processes (1) to (3) of Example 1.

(2) Next, an adhesive paste was applied to side faces of the honeycomb fired bodies manufactured in the process (1), and 16 pieces of the honeycomb fired bodies were bonded to one another with the adhesive paste interposed therebetween. Furthermore, the adhesive paste was solidified by heating at 180° C. for 20 minutes to manufacture a rectangular pillar-shaped aggregated body of the honeycomb fired bodies.

Subsequently, the aggregated body of the honeycomb fired bodies was cut by using an OD diamond blade having a board thickness of 0.5 mm into two equal pieces to obtain aggregated bodies of the honeycomb fired bodies having a longitudinal length of 150 mm. In the obtained aggregated bodies of the honeycomb fired bodies, predetermined cells are sealed only at either one end thereof.

In the process, as the adhesive paste, an adhesive paste containing 30.0% by weight of a silicon carbide powder having an average particle diameter of 0.6 µm, 21.4% by weight of silica sol, 8.0% by weight of carboxymethyl cellulose and 40.6% by weight of water was used.

(3) Next, in the aggregated body of the honeycomb fired body obtained in the process (2), a plug material paste was injected to end portions of unsealed cells to seal each cell at either one end thereof. Subsequently, the injected plug material paste was solidified by heating with a hot air at 180° C. for 15 minutes to form plugs.

Here, as the plug material paste, a paste having the same composition as that of the adhesive paste used in the process (2) was used.

(4) Next, the periphery of the aggregated body was cut by using a diamond cutter to manufacture a round pillar-shaped honeycomb block with the adhesive layer having a thickness of 1 mm.

Thereafter, a coating material paste was applied to the periphery of the honeycomb block to form a coating material paste layer. Then, the coating material paste layer was dried at 180° C. for 20 minutes to manufacture a round pillar-shaped honeycomb structure having a size of 143.8 mm in diameter× 150 mm in length with the coat layer formed on the periphery thereof.

Here, as the coating material paste, a paste having the same composition as that of the adhesive paste used in the process (2) was used.

As described above, in the honeycomb structure manufactured in Example 2, the plugs on one end face side were formed through the firing treatment, and the plugs on the other end face side were formed without carrying out the firing treatment.

The pressure loss and the regeneration limit value were measured on the honeycomb structure manufactured in the present Example by following the same method as in Example 1 to give 2.3 kPa and 7.9 g/l, respectively.

Accordingly, the honeycomb structure manufactured in Example 2 showed the similar degree of the pressure loss and the regeneration limit value to those of the honeycomb structure manufactured in Comparative Example 1 (conventional method).

(Third Embodiment)

In the present embodiment, the sequence of the processes in the method for manufacturing a honeycomb structure is different from the sequence of the processes in the method for manufacturing a honeycomb structure of the first embodiment of the present invention.

FIGS. 6A, 6B, 6C, 6D, 6E, 6F and 6G are explanatory views each illustrating the manufacturing processes of the third embodiment of the present invention.

Figure 6A:
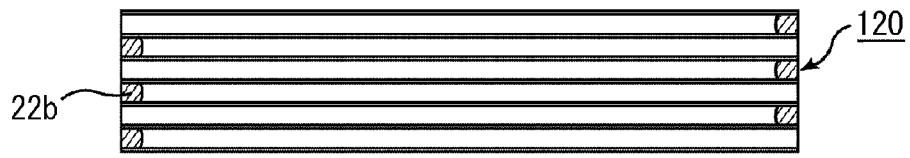
FIGS. 6A, 6B, 6C, 6D, 6E, 6F and 6G are explanatory views each illustrating manufacturing processes of the third embodiment of the present invention.
Figure 6B:
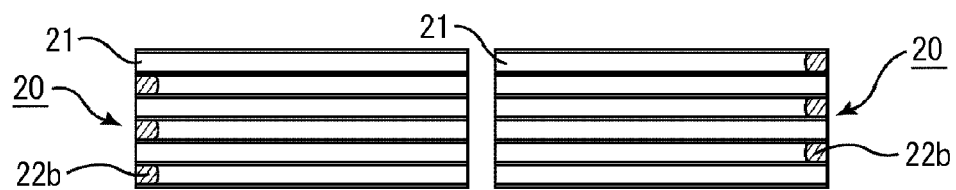

(1) In the method for manufacturing a honeycomb structure of the present embodiment, honeycomb fired bodies 20 each having a longitudinal length equal to a designed value of a longitudinal length of a honeycomb structure to be manufactured were manufactured by following the same method as in the processes (1) to (5) in the method for manufacturing a honeycomb structure of the first embodiment of the present invention (see FIGS. 6A and 6B).

(2) Next, an adhesive paste for forming an adhesive layer is applied to side faces of the honeycomb fired bodies 20 manufactured in the process (1) to form an adhesive paste layer. Repeatedly another honeycomb fired body is laminated on the adhesive paste layer to manufacture an aggregated body 110 of the honeycomb fired bodies in which a predetermined number of the honeycomb fired bodies are combined with one another.

Figure 6C:
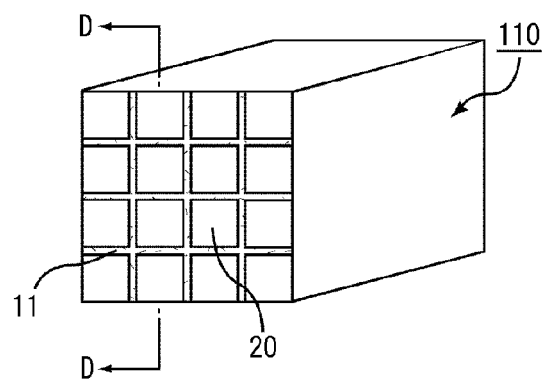
Figure 6D:
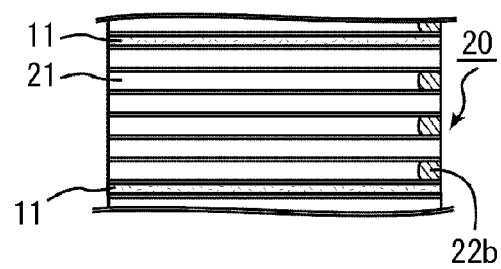

Here, in the process, after the honeycomb fired bodies are combined with one another, the aggregated body of the honeycomb fired bodies is heated to form the adhesive paste layer into the adhesive layer 11 (see FIGS. 6C and 6D).

FIG. 6D is a partially enlarged D-D line cross-sectional view of FIG. 6C.

Here, as the plug material paste, a paste having almost the same composition as the composition of a plug material paste used in the following process (3) is used.

(3) Next, in the aggregated body 110 of the honeycomb fired bodies manufactured in the process (2), the plug material paste is injected to end portions of unsealed cells out of cells needed to be sealed so that each cell is sealed at either one end thereof.

Figure 6E:
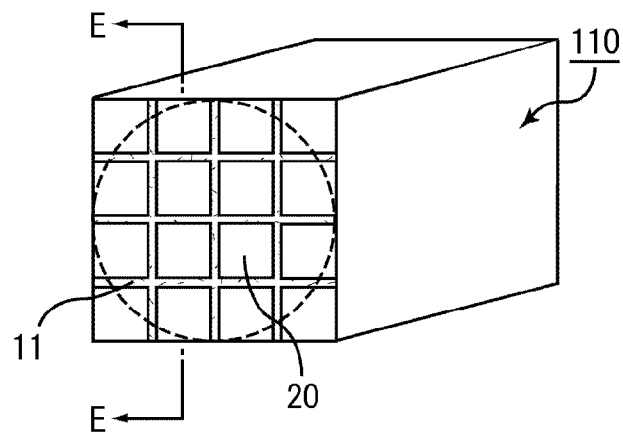
Figure 6F:
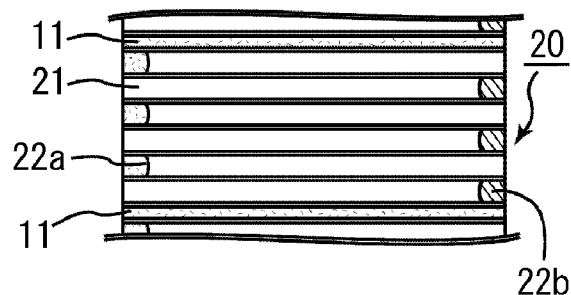
Figure 6G:
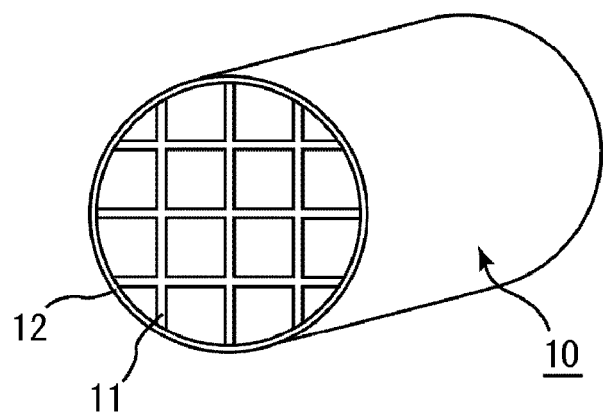

Thereafter, the injected plug material paste is solidified by heating to form plugs 22a (see FIGS. 6E and 6F).

FIG. 6F is a partially enlarged E-E line cross-sectional view of FIG. 6E.

Here, as the plug material paste, for example, a plug material paste containing an inorganic binder, an organic binder and inorganic particles is used. The plug material paste may further contain at least one of inorganic fibers and whiskers.

(4) Thereafter, the aggregated body 110 of the honeycomb fired bodies is cut along a broken line in FIG. 6E by using a diamond cutter to form a honeycomb block. A coating material paste is applied to the periphery of the honeycomb block and solidified by heating to form a coat layer 12. Thus, a honeycomb structure 10 is manufactured (see FIG. 6G).

Here, as the coating material paste, for example, a coating material paste having almost the same composition as that of the plug material paste injected in the process (3) is used.

In the present embodiment, a honeycomb structure can be manufactured through the processes as described above.

Here, the configuration of the honeycomb structure manufactured by the manufacturing method of the present embodiment is the same as the configuration of the honeycomb structure of the first embodiment of the present invention. The configuration of an exhaust gas purifying apparatus provided with the honeycomb structure manufactured by the manufacturing method of the present embodiment is the same as the configuration of the exhaust gas purifying apparatus of the first embodiment of the present invention.

The honeycomb structure, the exhaust gas purifying apparatus and the method for manufacturing a honeycomb structure according to the third embodiment of the present invention can exert the same effects as those of the first embodiment of the present invention.

Hereinafter, an example that discloses the third embodiment of the present invention more specifically is shown, but the present invention is not limited to the example.

EXAMPLE 3

(1) First, honeycomb fired bodies having a size of 34.3 mm×34.3 mm×150 mm in which predetermined cells are sealed only at either one end thereof were manufactured by following the same procedure as in the processes (1) to (5) of Example 1.

(2) Next, by following the same procedure as in the process (2) of Example 2, an adhesive paste was applied to side faces of the honeycomb fired bodies manufactured in the process (1), and 16 pieces of the honeycomb fired bodies were bonded to one another with the adhesive paste interposed therebetween. Furthermore, the adhesive paste was solidified by heating at 180° C. for 20 minutes to manufacture a rectangular pillar-shaped aggregated body of the honeycomb fired bodies.

Here, as the adhesive paste, an adhesive paste containing 30.0% by weight of a silicon carbide powder having an average particle diameter of 0.6 μm, 21.4% by weight of silica sol, 8.0% by weight of carboxymethyl cellulose and 40.6% by weight of water was used.

(3) Next, plugs were formed by following the same procedure as in the process (3) of Example 2 to seal each cell at either one end thereof.

Here, as the plug material paste for forming the plugs, a paste having the same composition as that of the adhesive paste used in the process (2) was used.

(4) Next, the periphery of the aggregated body of the honeycomb fired bodies was cut and a coat layer was formed thereon by following the same procedure as in the process (4) of Example 2 to manufacture a round pillar-shaped honeycomb structure having a size 143.8 mm in diameter×150 mm in length with the coat layer formed on the periphery.

Here, as the coating material paste for forming the coat layer, a paste having the same composition as the composition of the adhesive paste used in the process (2) was used.

As described above, in the honeycomb structure manufactured in Example 3, the plugs on one end face side were formed through the firing treatment, and the plugs on the other end face side were formed without carrying out the firing treatment.

The pressure loss and the regeneration limit value were measured on the honeycomb structure manufactured in the present Example by following the same method as in Example 1 to give 2.5 kPa and 7.9 g/l, respectively.

Accordingly, the honeycomb structure manufactured in Example 3 showed the similar degree of the pressure loss and the regeneration limit value to those of the honeycomb structure manufactured in Comparative Example 1 (conventional method).

Although the methods for manufacturing a honeycomb structure according to the first to third embodiments of the present invention described above are different, the honeycomb structures manufactured in the respective embodiments have the same configurations, and the exhaust gas purifying apparatuses provided with the respective honeycomb structures have the same configurations.

Figure 7:
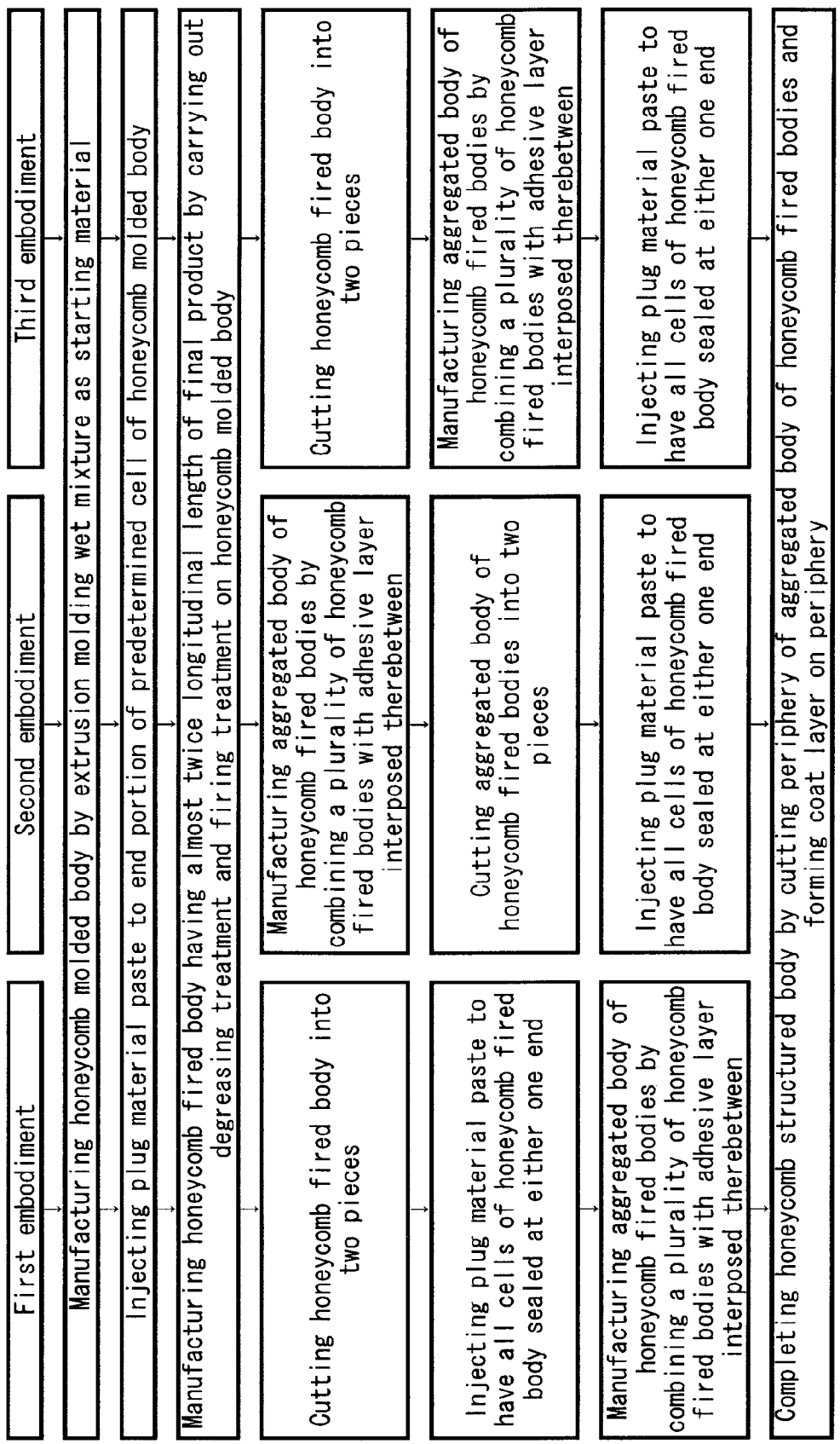
FIG. 7 is a flow chart of the methods for manufacturing a honeycomb structure according to the first to third embodiments of the present invention.

The processes of the methods for manufacturing a honeycomb structure according to the respective embodiments are shown in FIG. 7.

FIG. 7 is a flow chart of the methods for manufacturing a honeycomb structure of the first to third embodiments of the present invention.

As shown in FIG. 7, the timing for cutting the honeycomb fired bodies, the timing for combining the plurality of honeycomb fired bodies and the timing for injecting the plug material paste to the cells of the honeycomb fired bodies obtained by cutting are different among the methods for manufacturing a honeycomb structure according to the first to third embodiments of the present invention.

(Fourth Embodiment)

In the honeycomb structures according to the first to third embodiments of the present invention, all of the cells have the same rectangular cross-section perpendicular to the longitudinal direction of the honeycomb fired body. However, in the honeycomb structure of the present embodiment, the cross-sectional shapes of the respective cells perpendicular to the longitudinal direction of the honeycomb fired body may be, for example, an octagonal shape and a rectangular shape.

Figure 8A:
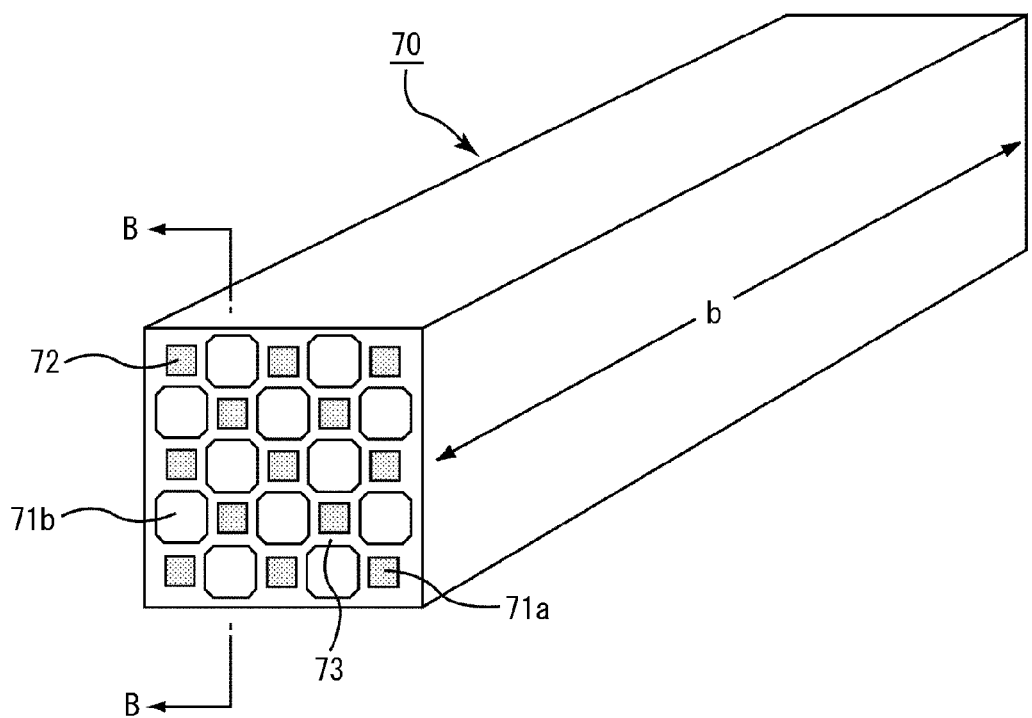
FIG. 8A is a perspective view illustrating another example of a honeycomb fired body constituting the honeycomb structure of an embodiment of the present invention.
Figure 8B:
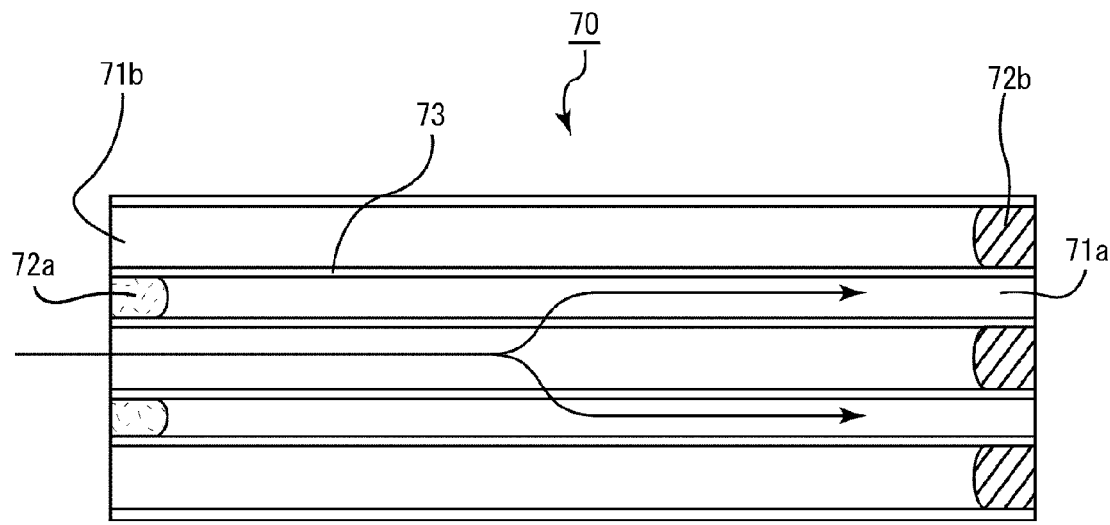
FIG. 8B is a B-B line cross-sectional view of FIG. 8A.

FIG. 8A is a perspective view illustrating another example of a honeycomb fired body constituting the honeycomb structure of the embodiment of the present invention, and FIG. 8B is a B-B line cross-sectional view of FIG. 8A.

A honeycomb fired body 70, shown in FIGS. 8A and 8B, has a configuration in which a large number of cells 71a and 71b are placed in parallel with one another in the longitudinal direction (direction of arrow b in FIG. 8A) with a cell wall 73 interposed therebetween. The respective cells 71a and 71b are sealed with a plug at either one end thereof. More specifically, in the cell 71a, an end portion on the exhaust-gas inlet side is sealed with an unfired plug (second plug) 72a, and in the cell 71b, an end portion on the exhaust-gas outlet side is sealed with a fired plug (first plug).

Here, the cross-sectional shape perpendicular to the longitudinal direction of the cell 71a is a rectangular shape, and the cross-sectional shape perpendicular to the longitudinal direction of the cell 71b is an octagonal shape.

Therefore, the plurality of cells formed in the honeycomb fired body 70 include large-capacity cells having a comparatively larger cross-sectional area perpendicular to the longitudinal direction and small-capacity cells having a comparatively smaller cross-sectional area. The first plugs are formed in the large-capacity cells, and the second plugs are formed in the small-capacity cells.

The honeycomb fired body 70 also has a configuration in which exhaust gases that have flowed in the cell 71b is discharged from the cell 71a after having always passed through the cell wall 73.

Therefore, also in the honeycomb fired body 70, the cell wall 73 functions as a filter for capturing PM and the like.

In the honeycomb fired body 70, the capacity of the cell (the cell 71b having the octagonal cross-section) having an opening on the exhaust-gas inlet side is larger than the capacity of the cell (the cell 71a having the square cross-section)

having an opening on the exhaust-gas outlet side. Therefore, the honeycomb structure 70 has a configuration suitable for capturing a large amount of PM as well as suppressing an increase in the pressure loss.

Moreover, in the honeycomb fired body having the large-capacity cells and the small-capacity cells, the combination of the cross-sectional shapes of the large-capacity cell and the small-capacity cell is not particularly limited to the octagonal shape and the rectangular shape, and a combination of any shapes such as a combination of two kinds of rectangular shapes having different cross-sectional areas may be used.

(Other Embodiments)

In the methods for manufacturing a honeycomb structure of the first to fourth embodiments of the present invention, a plurality of rectangular pillar-shaped honeycomb fired bodies are combined to form an aggregated body of the honeycomb fired bodies, and then the aggregated body is cut to manufacture a honeycomb block. However, in the method for manufacturing a honeycomb structure of the embodiment of the present invention, the honeycomb block may be manufactured by combining honeycomb fired bodies which have been formed to have a predetermined shape.

Figure 9A:
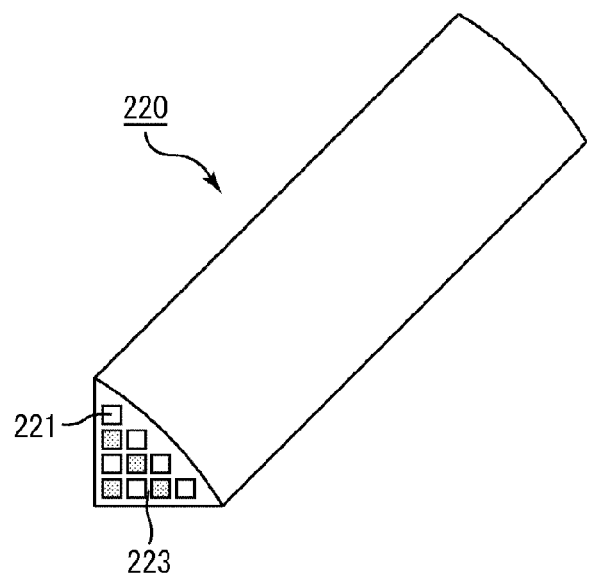
FIGS. 9A, 9B and 9C are perspective views each illustrating another example of a honeycomb fired body manufactured in the method for manufacturing a honeycomb structure according to an embodiment of the present invention.
Figure 9B:
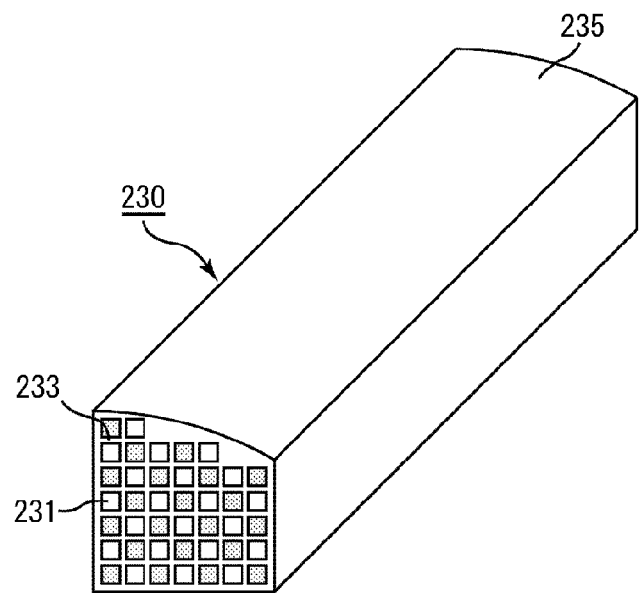
Figure 9C:
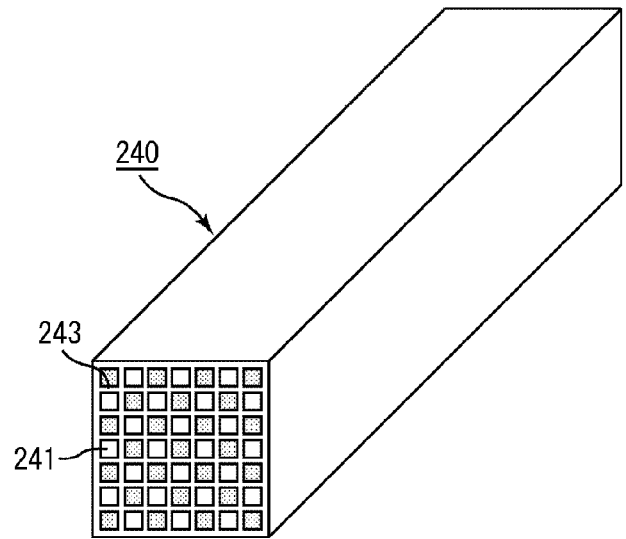

FIGS. 9A, 9B and 9C are perspective views each illustrating another example of a honeycomb fired body manufactured in the method for manufacturing a honeycomb structure of the embodiment of the present invention.

Namely, a honeycomb block may be manufactured by combining honeycomb fired bodies 220, 230 and 240, shown in FIGS. 9A, 9B and 9C, each of which has a plurality of cells 221, 231 or 241 with a cell wall 223, 233 or 243 interposed therebetween.

Here, upon manufacturing the honeycomb block 15 shown in FIG. 2, four pieces of each of the honeycomb fired bodies 220 and 240, and eight pieces of the honeycomb fired bodies 230 are used.

In the honeycomb structure according to the embodiments of the present invention described above, there is no description on supporting of a catalyst on the honeycomb structure. However, in the embodiments of the present invention, a catalyst may be supported on the honeycomb structure.

By supporting a catalyst on the honeycomb structure, the honeycomb structure with a catalyst supported thereon and an exhaust gas purifying apparatus provided with the honeycomb structure make it easier to convert toxic components such as CO, HC and NOx contained in exhaust gases. Moreover, the supported catalyst may lower the burning temperature of PM.

As the catalyst, a catalyst containing a noble metal, an alkali metal, an alkaline-earth metal, an oxide thereof or the like maybe used. In addition, the catalyst is preferably supported on the honeycomb structure in such a manner that the catalyst is on the surface of a layer of an oxide having a high specific surface area such as alumina.

In the embodiments of the present invention, when a paste containing at least inorganic particles and an inorganic binder is used as the plug material paste, examples of the inorganic particles include carbides, nitrides and the like, more specifically, inorganic particles including silicon carbide, silicon nitride or boron nitride, and the like. Each of these may be used alone, or two or more kinds of these may be used in combination. Silicon carbide is preferably used among these inorganic particles due to its superior thermal conductivity.

Examples of the inorganic binder include silica sol, alumina sol and the like. Each of these may be used alone, or two or more kinds of these maybe used in combination. Silica sol is preferably used among the inorganic binders.

In addition, the plug material paste may contain at least one of inorganic fibers and whiskers. Here, examples of the inorganic fibers and the whiskers include ceramic fibers such as silica-alumina, mullite, alumina and silica, and the like. Each of these may be used alone, or two or more kinds of these may be used in combination. Alumina fibers are preferably used among the inorganic fibers and the whiskers.

As described above, the plug material paste may have almost the same composition as that of the wet mixture used for manufacturing the honeycomb fired body by extrusion-molding.

Here, the former material (the plug material paste containing at least inorganic particles and an inorganic binder) is preferably used as the plug material paste for forming the plugs formed without carrying out the firing treatment thereon, and the latter material (paste having almost the same composition as that of the wet mixture) is preferably used for forming the plugs formed through the firing treatment.

However, the former plug material paste may be used as the material for the plugs formed through the firing treatment, or the latter plug material paste may be used as the material for the plugs formed without carrying out the firing treatment thereon.

Moreover, in the first to fourth embodiments of the present invention, all of the plugs formed without carrying out the firing treatment thereon, the adhesive layer and the coat layer are formed by using the pastes having almost the same composition. However, these material pastes do not necessarily need to have almost the same composition.

The shape of the honeycomb structure of the embodiments of the present invention is not limited to the round pillar shape shown in FIG. 2, and the shape may be an optional pillar shape such as cylindroid pillar shape and polygonal pillar shape.

A porosity of the honeycomb fired body according to the embodiments of the present invention is preferably at least about 35% and at most about 60%.

An average pore diameter of the honeycomb fired body is preferably at least about 5 μm and at most about 30 μm.

Here, the porosity and the average pore diameter can be measured by the conventionally known methods such as mercury porosimetry method, an Archimedes' method, a measuring method using a scanning electron microscope (SEM).

The main component of the constituent materials of the honeycomb fired body is not limited to silicon carbide, and examples of other main components of the constituent materials include nitride ceramics such as aluminum nitride, silicon nitride, boron nitride, and titanium nitride; carbide ceramics such as zirconium carbide, titanium carbide, tantalum carbide, and tungsten carbide; oxide ceramics such as alumina, zirconia, cordierite, mullite, and aluminum titanate; and the like.

Among these components, non-oxide ceramics are preferable, and silicon carbide is more preferable because this is excellent in thermal resistance properties, mechanical strength, thermal conductivity and the like. Moreover, silicon-containing ceramics, in which metallic silicon is blended with the above described ceramics, as well as a ceramic material such as ceramic bound by silicon or silicate compounds, maybe used. And among these, those ceramics (silicon-containing silicon carbide) in which metallic silicon is blended with silicon carbide are preferably used.

Especially, silicon-containing silicon carbide ceramics containing about 60% by weight or more of silicon carbide are preferable.

A particle diameter of the ceramic powder in the wet mixture extrusion-molded in the method for manufacturing a honeycomb structure body of the embodiments of the present invention is not particularly limited, and a ceramic powder which tends not to cause the case where a size of the honeycomb structure manufactured by the following firing treatment becomes smaller than that of a degreased honeycomb molded body is preferable.

For example, a ceramic powder containing 100 parts by weight of a powder having an average particle diameter of at least about 1.0 μm and at most about 50.0 μm and at least about 5 parts by weight and at most about 65 parts by weight of a powder having an average particle diameter of at least about 0.1 μm and at most about 1.0 μm is preferable.

An organic binder contained in the wet mixture to be extrusion-molded in the method for manufacturing a honeycomb structure of the embodiments of the present invention is not particularly limited, and examples thereof include methyl cellulose, carboxymethyl cellulose, hydroxyethyl cellulose, polyethylene glycol and the like. Methyl cellulose is preferable among these.

A plasticizer contained in the wet mixture is not particularly limited, and examples thereof include glycerin, and the like.

A lubricant contained in the wet mixture is not particularly limited, and examples thereof include polyoxyalkylene-based compounds such as polyoxyethylene alkyl ether and polyoxypropylene alkyl ether, and the like.

The specific examples of the lubricant include polyoxyethylene monobutyl ether, polyoxypropylene monobutyl ether, and the like.

Here, depending on the case, a plasticizer and a lubricant may not be contained in the wet mixture.

Also, a dispersion medium may be used upon preparing the wet mixture, and examples thereof include water, an organic solvent such as benzene, alcohol such as methanol, and the like.

Moreover, a forming auxiliary may be added to the wet mixture.

The forming auxiliary is not particularly limited, and examples thereof include ethylene glycol, dextrin, fatty acids, fatty acid soap, polyalcohol, and the like.

Furthermore, a pore-forming agent such as balloons that are fine hollow spheres including oxide-based ceramics, spherical acrylic particles, and graphite may be added to the wet mixture as needed.

The balloons are not particularly limited, and examples thereof include alumina balloons, glass micro balloons, shirasu balloons, fly ash balloons (FA balloons), mullite balloons, and the like. Alumina balloons are preferable among these.

Moreover, in the first to fourth embodiments of the present invention, upon combining the plurality of honeycomb fired bodies with one another, the method is used in which the adhesive paste is applied to the side faces of the respective honeycomb fired bodies, and the honeycomb fired bodies are successively laminated. However, the plurality of honeycomb fired bodies may be combined with one another as follows. A spacer is attached to the surface of each honeycomb fired body so as to ensure a space between the honeycomb fired bodies. The honeycomb fired bodies are arranged with the spacer interposed therebetween, and then an adhesive paste is injected into the space between the honeycomb fired bodies to combine the honeycomb fired bodies with one another.

In the first to fourth embodiments of the present invention, the honeycomb block is manufactured by combining the plurality of honeycomb fired bodies with one another. However, in the honeycomb structure and the exhaust gas purifying apparatus of the embodiments of the present invention, the honeycomb block does not necessarily need to be formed by the plurality of honeycomb fired bodies, but the honeycomb block may be formed by a single honeycomb fired body.

Here, upon manufacturing such a honeycomb structure including a honeycomb block formed by a single honeycomb fired body, upon extrusion-molding a wet mixture, a honeycomb molded body which has almost the same cross-sectional shape perpendicular to the longitudinal direction thereof as the cross-sectional shape of a honeycomb block perpendicular to the longitudinal direction thereof, may be manufactured.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacturing a honeycomb structure, comprising:
    molding a ceramic raw material to manufacture at least one honeycomb molded body having a plurality of cell walls extending along a longitudinal direction of the at least one honeycomb molded body to define cells;
    filling first cells at first end portions provided at a first end face side of the at least one honeycomb molded body in the longitudinal direction with a first plug material paste to form first plugs;
    filling third cells at third end portions provided at a third end face side of the at least one honeycomb molded body in the longitudinal direction with a third plug material paste to form first plugs;
    firing said at least one honeycomb molded body to manufacture at least one honeycomb fired body having first plugs;
    cutting said at least one honeycomb fired body along a plane substantially perpendicular to the longitudinal direction to create a second end face side of the at least one honeycomb fired body;
    filling second end portions of second cells provided at the second end face side in the longitudinal direction with a second plug material paste, the second cells having none of the first plugs, the second plug material being different than the first plug material paste and the third plug material paste;
    solidifying the plug material paste in the second end portions through heating to form second plugs; and
    producing a honeycomb block including at least one honeycomb fired body.

2. The method for manufacturing a honeycomb structure according to claim 1,
    wherein the at least one honeycomb fired body is cut after the at least one honeycomb fired body having said first plugs is manufactured, and
    wherein the honeycomb block is produced after the second plugs are formed.

3. The method for manufacturing a honeycomb structure according to claim 1, comprising:
    producing said honeycomb block using a single honeycomb fired body.

4. The method for manufacturing a honeycomb structure according to claim 1, comprising:
    combining a plurality of honeycomb fired bodies with an adhesive layer provided between the plurality of honeycomb fired bodies to produce the honeycomb block.

5. The method for manufacturing a honeycomb structure according to claim 4,
wherein
said second plug includes composition substantially same as composition of said adhesive layer.

6. The method for manufacturing a honeycomb structure according to claim 1, comprising:
combining a plurality of honeycomb fired bodies having first plugs with an adhesive layer provided between the plurality of honeycomb fired bodies to produce a honeycomb block having the first plugs at the first and third end face side; and
cutting the honeycomb block along the plane substantially perpendicular to the longitudinal direction.

7. The method for manufacturing a honeycomb structure according claim 1, wherein the plurality of cells comprise large-capacity cells each having a first area of cross-section perpendicular to the longitudinal direction and small-capacity cells each having a second area of cross-section perpendicular to the longitudinal direction,
the first area is larger than the second area,
said large-capacity cells have said first plug, and
said small-capacity cells have said second plug.

8. The method for manufacturing a honeycomb structure according to claim 7,
wherein
said at least one honeycomb fired body includes cells having an octagonal cross section perpendicular to the longitudinal direction and cells having a rectangular cross section perpendicular to the longitudinal direction.

9. The method for manufacturing a honeycomb structure according to claim 7,
wherein
said at least one honeycomb fired body includes first and second cell groups having a rectangular cross section, the first cell group having a cross-sectional area different from a cross-sectional area of the second cell group.

10. The method for manufacturing a honeycomb structure according to claim 1, further comprising:
applying a coating material paste to a periphery of said honeycomb block after producing said honeycomb block; and
solidifying said coating material paste to form a coat layer.

11. The method for manufacturing a honeycomb structure according to claim 10,
wherein
the second plugs include composition substantially same as composition of said coat layer.

12. The method for manufacturing a honeycomb structure according to claim 1, wherein
the second plug material paste to form said second plugs contains at least inorganic particles and an inorganic binder.

13. The method for manufacturing a honeycomb structure according to claim 1,
wherein
said first plugs include composition substantially same as composition of the at least one honeycomb fired body.

14. The method for manufacturing a honeycomb structure according to claim 1,
wherein
the at least one honeycomb fired body is cut using a diamond cutter, an OD diamond blade, an ID diamond blade, a multi-wire, or a multi-blade.

15. The method for manufacturing a honeycomb structure according to claim 1,
wherein
a plurality of honeycomb fired bodies are combined with one another to produce an aggregated body of the honeycomb fired bodies, and then the aggregated body is cut to produce said honeycomb block.

16. The method for manufacturing a honeycomb structure according to claim 1,
wherein
honeycomb fired bodies having a predetermined shape are formed, and
said honeycomb fired bodies are combined with one another to produce said honeycomb block.

17. The method for manufacturing a honeycomb structure according to claim 16,
wherein
the honeycomb fired body comprises silicon carbide.

18. The method for manufacturing a honeycomb structure according to claim 16,
wherein
the honeycomb fired body comprises silicon-containing silicon carbide.

19. The method for manufacturing a honeycomb structure according to claim 1,
wherein
the honeycomb fired body comprises at least one of nitride ceramics, carbide ceramics, oxide ceramics, silicon-containing ceramics or ceramics bound by silicon and silicate compounds.

\* \* \* \* \*

UNITED STATES PATENT AND TRADEMARK OFFICE
CERTIFICATE OF CORRECTION

PATENT NO. : 8,323,557 B2
APPLICATION NO. : 13/419467
DATED : December 4, 2012
INVENTOR(S) : Hiroki Sato Page 1 of 1

It is certified that error appears in the above-identified patent and that said Letters Patent is hereby corrected as shown below:

On the Title page, item (30) should read as follows:

(30)    Foreign Application Priority Data

Feb. 13, 2008   (WO) .................... PCT/JP2008/052374

In column 24, lines 45 and 46 should read as follows:

of the first plugs, the second plug material paste being different from the first plug material paste and the third plug Signed and Sealed this
Twelfth Day of March, 2013

Teresa Stanek Rea
*Acting Director of the United States Patent and Trademark Office*